United States Patent
Rivas

(10) Patent No.: US 12,530,222 B1
(45) Date of Patent: Jan. 20, 2026

(54) WORKLOAD ORCHESTRATION IN HYBRID QUANTUM/CLASSICAL COMPUTING SYSTEMS

(71) Applicant: Rigetti & Co, LLC, Berkeley, CA (US)

(72) Inventor: Jesus David Rivas, San Francisco, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 0 days.

(21) Appl. No.: 17/172,673

(22) Filed: Feb. 10, 2021

Related U.S. Application Data

(60) Provisional application No. 62/972,408, filed on Feb. 10, 2020.

(51) Int. Cl.
  *G06F 9/48* (2006.01)
  *G06F 9/50* (2006.01)
  (Continued)

(52) U.S. Cl.
  CPC .......... *G06F 9/4843* (2013.01); *G06F 9/5077* (2013.01); *G06N 10/80* (2022.01); *H04L 67/10* (2013.01)

(58) Field of Classification Search
  CPC ........ G06N 10/00; G06N 10/80; G06N 5/003; G06N 10/40; G06N 10/20; G06N 10/60; G06N 20/00; G06N 20/10; G06N 3/006; G06N 3/04; G06N 3/0454; G06N 3/08; G06N 3/088; G06N 5/043; H04L 67/10; H04L 67/565; H04L 9/0852;
  (Continued)

(56) References Cited

U.S. PATENT DOCUMENTS 9,288,128 B1 * 3/2016 Palacios .................. H04L 69/14
9,537,953 B1 * 1/2017 Dadashikelayeh ... G06F 9/4843
(Continued)

FOREIGN PATENT DOCUMENTS

| WO | 2014210368 | 12/2014 |
|---|---|---|
| WO | 2020047426 A1 | 3/2020 |
| WO | 2020168158 A1 | 8/2020 |

OTHER PUBLICATIONS

KIPO, International Search Report and Written Opinion mailed Jan. 17, 2020, in PCT/US2019/049090, 12 pgs.
(Continued)

*Primary Examiner* — Greg C Bengzon
(74) *Attorney, Agent, or Firm* — Henry Patent Law Firm PLLC

(57) ABSTRACT

In some aspects, a cloud-based computer system includes: a quantum computing system comprising a quantum processing unit; a container management and execution system configured to receive a container and execute a program within the container; and a communication channel between the container management and execution system and the quantum computing system for providing program instructions to the quantum computing system. The container management and execution system and the quantum computer system may be co-located in a data center or located in different data centers. The latency of the communication channel may be selected to optimize cost for a required computer performance.

21 Claims, 16 Drawing Sheets

(51) Int. Cl.
*G06N 10/80* (2022.01)
*H04L 67/10* (2022.01)

(58) Field of Classification Search
CPC ............ H04L 12/1403; H04L 12/1492; H04L 41/046; H04L 63/08; H04L 63/20; H04L 67/06; H04L 67/12; H04L 67/51; H04L 67/52; H04L 67/60; G06F 2009/45595; G06F 9/45558; G06F 9/5044; G06F 9/5072; G06F 9/54; G06F 15/16; G06F 16/25; G06F 16/951; G06F 2009/45562; G06F 2009/45583; G06F 21/44; G06F 2209/5011; G06F 8/20; G06F 8/34; G06F 8/36; G06F 9/455; G06F 9/4806; G06F 9/5066; G06F 9/5077; G06F 9/5083; G06F 9/547

See application file for complete search history.

(56) References Cited

U.S. PATENT DOCUMENTS

| | | | |
|---|---|---|---|
| 9,774,401 B1* | 9/2017 | Borrill ................. | H04L 9/0852 |
| 9,935,937 B1 | 4/2018 | Potlapally et al. | |
| 10,127,499 B1* | 11/2018 | Rigetti .................. | G06N 10/00 |
| 10,637,142 B1* | 4/2020 | Tran ........................ | H01Q 1/44 |
| 10,824,478 B2* | 11/2020 | Dadashikelayeh ... | H04L 41/046 |
| 10,873,794 B2* | 12/2020 | Kulshreshtha ...... | H04L 63/1425 |
| 11,194,573 B1* | 12/2021 | Smith ................... | G06F 9/3804 |
| 11,323,919 B1* | 5/2022 | Parulkar ........... | H04W 36/0011 |
| 11,356,493 B2* | 6/2022 | Oesterreicher .... | H04N 21/2187 |
| 11,797,872 B2* | 10/2023 | Bocharov ............. | G06N 10/00 |
| 12,112,234 B2 | 10/2024 | Karalekas et al. | |
| 2004/0019806 A1 | 1/2004 | Beyh | |
| 2011/0238378 A1 | 9/2011 | Allen et al. | |
| 2013/0304903 A1* | 11/2013 | Mick ......................... | G06F 9/44 |
| | | | 709/224 |
| 2014/0337612 A1 | 11/2014 | Williams | |
| 2016/0125311 A1* | 5/2016 | Fuechsle ................ | H10N 60/80 |
| | | | 257/31 |
| 2017/0357539 A1* | 12/2017 | Dadashikelayeh ..... | G06F 21/44 |
| 2018/0062764 A1* | 3/2018 | Borrill ................. | H04L 9/0852 |
| 2018/0091440 A1* | 3/2018 | Dadashikelayeh ... | G06F 16/951 |
| 2018/0157986 A1* | 6/2018 | Oxford ................. | G06N 10/00 |
| 2018/0368007 A1* | 12/2018 | Cummings ............ | H04L 67/51 |
| 2019/0007051 A1* | 1/2019 | Sete ....................... | G06N 10/00 |
| 2019/0049495 A1 | 2/2019 | Ofek et al. | |
| 2020/0117764 A1* | 4/2020 | Zuccarelli ............. | G06N 10/60 |
| 2020/0175000 A1* | 6/2020 | Borrill ................ | G06F 16/2379 |
| 2020/0177671 A1* | 6/2020 | Tofighbakhsh ........ | H04L 67/12 |
| 2020/0178149 A1* | 6/2020 | Seenappa .............. | H04W 40/02 |
| 2020/0257566 A1* | 8/2020 | Ganguli .............. | H04L 41/5025 |
| 2020/0329114 A1* | 10/2020 | Bahl ....................... | H04L 67/10 |
| 2020/0334563 A1* | 10/2020 | Gambetta ............. | B82Y 10/00 |
| 2020/0358719 A1* | 11/2020 | Mestery ................ | H04L 47/822 |
| 2020/0404069 A1* | 12/2020 | Li ........................... | H04W 8/24 |
| 2021/0091755 A1* | 3/2021 | Cohen ...................... | H03K 3/38 |
| 2021/0157622 A1* | 5/2021 | Ananthapur Bache ...................... | |
| | | | G06F 11/3495 |
| 2021/0157662 A1* | 5/2021 | Heckey ................. | G06F 9/5072 |
| 2021/0158199 A1* | 5/2021 | Heckey .................. | G06F 15/16 |
| 2021/0158232 A1* | 5/2021 | Bolt ........................ | G06F 9/455 |
| 2021/0158425 A1* | 5/2021 | Kasprowicz ........... | G06N 10/40 |
| 2021/0173588 A1* | 6/2021 | Kannan ............... | G06F 11/1076 |
| 2021/0173660 A1* | 6/2021 | Hogaboam ........... | G06F 9/3851 |
| 2021/0176055 A1* | 6/2021 | Rahman ................ | G06N 10/00 |
| 2021/0208943 A1* | 7/2021 | Baughman ............ | G06F 9/5044 |
| 2021/0233045 A1* | 7/2021 | Singh ..................... | G06Q 20/12 |
| 2021/0256414 A1* | 8/2021 | Kachman ............... | G06N 20/00 |
| 2021/0263667 A1* | 8/2021 | Whitlock ............. | G06F 3/0614 |
| 2021/0286601 A1* | 9/2021 | Fitzsimons ............... | G06F 8/72 |
| 2021/0313973 A1* | 10/2021 | Cohen .................. | H03K 19/195 |
| 2021/0334081 A1* | 10/2021 | Chong ...................... | G06F 9/48 |
| 2021/0357797 A1* | 11/2021 | Karalekas ............. | G06N 10/80 |
| 2022/0050797 A1* | 2/2022 | Dreier ...................... | G06F 13/28 |
| 2022/0084085 A1* | 3/2022 | Rigetti ............. | H04M 15/8214 |
| 2022/0164693 A1* | 5/2022 | Tezak ................... | H03K 19/195 |
| 2022/0374390 A1* | 11/2022 | Chong .................. | G06N 10/40 |

OTHER PUBLICATIONS

Farhi, E., et al., "A Quantum Approximate Optimization Algorithm", arXiv:1411.4028v1 [quant-ph], Nov. 14, 2014, 16 pages.

Karalekas, et al., "Compiler Tools for Hybrid Quantum-Classical Algorithms", APS March Meeting, Boston, MA, Mar. 5, 2019, 38 pgs.

McClean, et al., "Barren plateaus in quantum neural network training landscapes", Nature Communications, vol. 9, No. 4812, Nov. 2018, 6 pgs.

McClean, et al., "The theory of variational hybrid quantum-classical algorithms", New J. Phys. 18 (2016)023023, Feb. 5, 2016, 23 pgs.

Preskill, "Quantum Computing in the NISQ era and beyond", Quantum, vol. 2, pp. 79, Jul. 30, 2018, 20 pgs.

Riste, et al., "Feedback Control of a Solid-State Qubit Using High-Fidelity Projective Measurement", PhysRevLett. 109.240502, Dec. 2012, 5 pgs.

Smelyanskiy, et al., "qHiPSTER: The Quantum High Performance Software Testing Environment", retrieved on Dec. 30, 2019; arXiv:1601.07195v2, Jan. 2016, 10 pgs.

Smith, R. S., et al., "A Practical Quantum Instruction Set Architecture", arXiv:1608.03355v2 [quant-ph], Feb. 17, 2017, 15 pages.

Smith, Robert S, et al., "A Practical Quantum Instruction Set Architecture", arXiv:1608.03355v1 [quant-ph], Aug. 11, 2016, 14 pages.

"Kubernetes", Wikipedia, downloaded from https://en.wikipedia.org/w/index.php?title=Kubernetes&oldid=938877546, Feb. 2, 2020, 11 pgs.

"Singularity (software)", Wikipedia, retrieved from https://en.wikipedia.org/w/index.php?title=Singularity_(software)&oldid=939184521, Feb. 4, 2020, 5 pgs.

Jones, et al., "Scalable instrumentation for general purpose quantum computers", Bulletin of the American Physical Society, Mar. 2019, 4 pgs.

EPO, Extended European Search Report mailed May 9, 2022, in EP 19854101.3, 12 pgs.

Britt, et al., "High-Performance Computing with Quantum Processing Units", ACM Journal on Emerging Technologies in Computing Systems, vol. 13, No. 3, Mar. 2017, 13 pgs.

Britt, et al., "Quantum Accelerators for High-Performance Computing Systems", arXiv:1712.01423v1, Dec. 5, 2017, 7 pgs.

Devitt, "Performing Quantum Computing Experiments in the Cloud", arXiv:1605.05709v4, Sep. 1, 2016, 29 pgs.

McCaskey, et al., "Hybrid Programming for Near-term Quantum Computing Systems", arXiv:1805.09279v1, May 23, 2018, 9 pgs.

USPTO, Non-Final Office Action issued in U.S. Appl. No. 17/184,702 on Dec. 27, 2023, 48 pages.

EPO, Communication pursuant to Article 94(3) issued in Application No. 19854101.3 on Aug. 20, 2024, 20 pages.

Chong, Frederic T., et al., "Programming languages and compiler design for realistic quantum hardware", Nature, vol. 549, Sep. 14, 2017, pp. 180-187, 8 pages.

* cited by examiner

WORKLOAD ORCHESTRATION IN HYBRID QUANTUM/CLASSICAL COMPUTING SYSTEMS

CROSS-REFERENCE TO RELATED APPLICATIONS

This application claims priority to U.S. Provisional Application No. 62/972,408 filed Feb. 10, 2020, and entitled "Workload Orchestration in Hybrid Quantum/Classical Computing Systems." The entire contents of the above-referenced priority application are hereby incorporated by reference.

BACKGROUND

The following description relates to hybrid quantum/classical computing systems, and to workload orchestration in these systems.

Quantum computers can perform computational tasks by storing and processing information within quantum states of quantum systems. For example, qubits (i.e., quantum bits) can be stored in and represented by an effective two-level sub-manifold of a quantum coherent physical system. A variety of physical systems have been proposed for quantum computing applications. Examples include superconducting circuits, trapped ions, spin systems and others.

DETAILED DESCRIPTION

According to some embodiments, hybrid quantum/classical computing systems are described herein. The systems may include management and execution systems for orchestration of computing workloads.

According to some embodiments, methods of computation on hybrid quantum/classical computing systems are described herein. The systems may include management and execution systems for orchestration of computing workloads.

Figure 1:
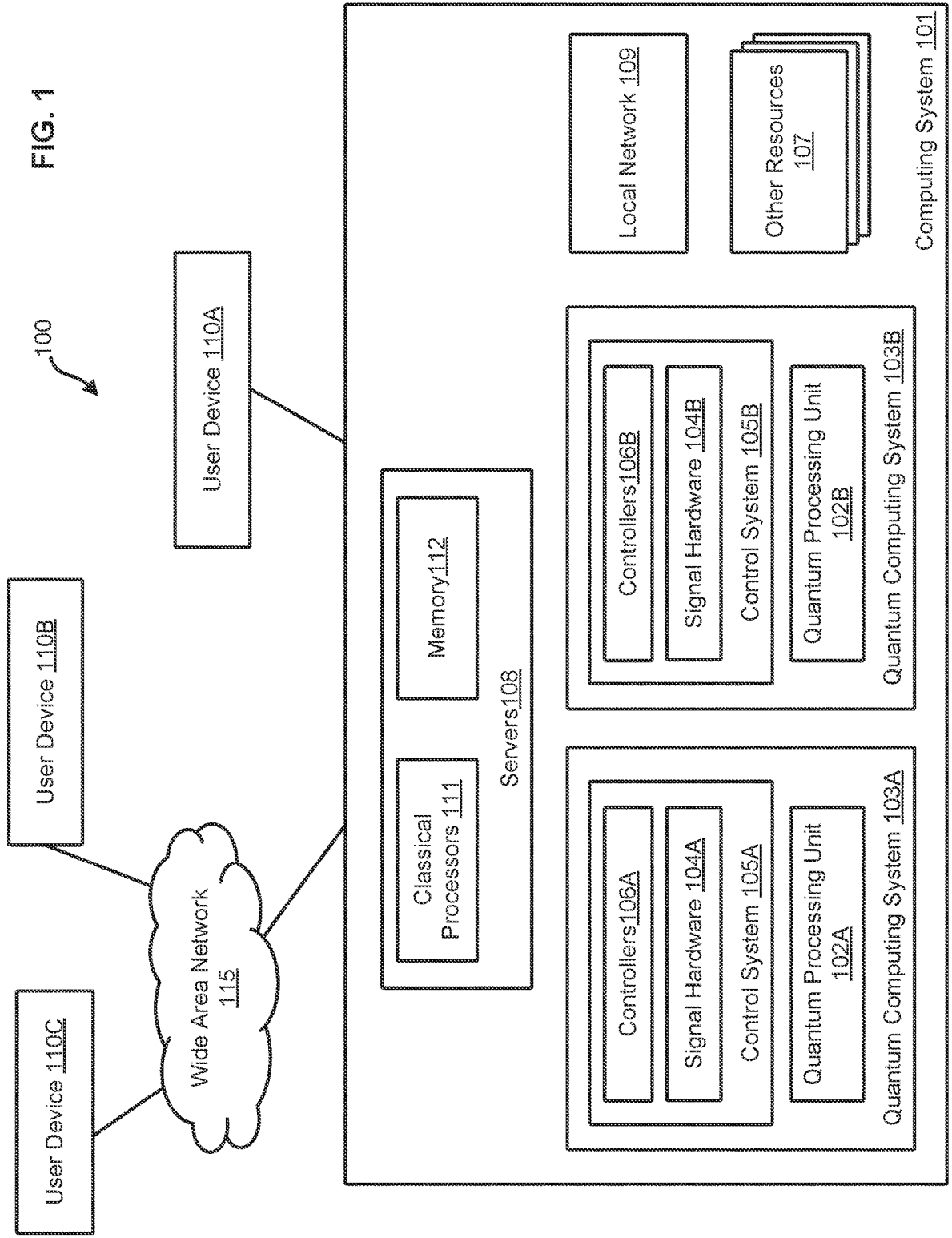
FIG. 1 is a block diagram of an example computing system.

FIG. 1 is a block diagram of an example computing environment 100. The example computing environment 100 shown in FIG. 1 includes a computing system 101 and user devices 110A, 110B, 110C. A computing environment may include additional or different features, and the components of a computing environment may operate as described with respect to FIG. 1 or in another manner.

The example computing system 101 includes classical and quantum computing resources and exposes their functionality to the user devices 110A, 110B, 110C (referred to collectively as "user devices 110"). The computing system 101 shown in FIG. 1 includes one or more servers 108, quantum computing systems 103A, 103B, a local network 109 and other resources 107. The computing system 101 may also include one or more user devices (e.g., the user device 110A) as well as other features and components. A computing system may include additional or different features, and the components of a computing system may operate as described with respect to FIG. 1 or in another manner.

The example computing system 101 can provide services to the user devices 110, for example, as a cloud-based or remote-accessed computer system, as a distributed computing resource, as a supercomputer or another type of high-performance computing resource, or in another manner. The computing system 101 or the user devices 110 may also have access to one or more other quantum computing systems (e.g., quantum computing resources that are accessible through the wide area network 115, the local network 109 or otherwise).

The user devices 110 shown in FIG. 1 may include one or more classical processor, memory, user interfaces, communication interfaces, and other components. For instance, the user devices 110 may be implemented as laptop computers, desktop computers, smartphones, tablets or other types of computer devices. In the example shown in FIG. 1, to access computing resources of the computing system 101, the user devices 110 send information (e.g., programs, instructions, commands, requests, input data, etc.) to the servers 108; and in response, the user devices 110 receive information (e.g., application data, output data, prompts, alerts, notifications, results, etc.) from the servers 108. The user devices 110 may access services of the computing system 101 in another manner, and the computing system 101 may expose computing resources in another manner.

In the example shown in FIG. 1, the local user device 110A operates in a local environment with the servers 108 and other elements of the computing system 101. For instance, the user device 110A may be co-located with (e.g., located within 0.5 to 1 km of) the servers 108 and possibly other elements of the computing system 101. The precise distance between user device 110A and servers 108 is a function of both physical distance and network complexity producing a network latency that may be small (e.g. less than 1 ms in some embodiments, less than 10 ms in other embodiments, less than 100 ns in further embodiments). As shown in FIG. 1, the user device 110A communicates with the servers 108 through a local data connection.

The local data connection in FIG. 1 is provided by the local network 109. For example, some or all of the servers 108, the user device 110A, the quantum computing systems 103A, 103B and the other resources 107 may communicate with each other through the local network 109. In some implementations, the local network 109 operates as a communication channel that provides one or more low-latency communication pathways from the server 108 to the quantum computer systems 103A, 103B (or to one or more of the elements of the quantum computer systems 103A, 103B). The local network 109 may include one or more wired or wireless routers, wireless access points (WAPs), wireless mesh nodes, switches, high-speed cables, or a combination of these and other types of local network hardware elements. In some cases, the local network 109 includes a software-defined network that provides communication among virtual resources, for example, among an array of virtual machines operating on the server 108 and possibly elsewhere.

In the example shown in FIG. 1, the remote user devices 110B, 110C operate remote from the servers 108 and other elements of the computing system 101. For instance, the user devices 110B, 110C may be located at a remote distance (e.g., more than 1 km, 10 km, 100 km, 1,000 km, 10,000 km, or farther) from the servers 108 and possibly other elements of the computing system 101. The precise distance between remote user device 110B, 110C and servers 108 is a function of both physical distance and network complexity producing a network latency that may be large (e.g., less than 5 ms in embodiments, less than 50 ms in other embodiments, less than 500 ms in further embodiments, etc.). As shown in FIG. 1, each of the user devices 110B, 110C communicates with the servers 108 through a remote data connection.

The remote data connection in FIG. 1 is provided by a wide area network 115, which may include, for example, the Internet or another type of wide area communication network. In some cases, remote user devices use another type of remote data connection (e.g., satellite-based connections, a cellular network, a virtual private network, etc.) to access the servers 108. The wide area network 115 may include one or more internet servers, firewalls, service hubs, base stations, or a combination of these and other types of remote networking elements. Generally, the computing environment 100 can be accessible to any number of remote user devices.

The example servers 108 shown in FIG. 1 can manage interaction with the user devices 110 and utilization of the quantum and classical computing resources in the computing system 101. For example, based on information from the user devices 110, the servers 108 may delegate computational tasks to the quantum computing systems 103A, 103B and the other resources 107; the servers 108 can then send information to the user devices 110 based on output data from the computational tasks performed by the quantum computing systems 103A, 103B and the other resources 107.

As shown in FIG. 1, the servers 108 are classical computing resources that include classical processors 111 and memory 112. The servers 108 may also include one or more communication interfaces that allow the servers to communicate via the local network 109, the wide area network 115 and possibly other channels. In some implementations, the servers 108 may include a host server, an application server, a virtual server or a combination of these and other types of servers. The servers 108 may include additional or different features and may operate as described with respect to FIG. 1 or in another manner.

The classical processors 111 can include various kinds of apparatus, devices, and machines for processing data, including, by way of example, a microprocessor, a central processing unit (CPU), a graphics processing unit (GPU), an FPGA (field programmable gate array), an ASIC (application specific integrated circuit), or combinations of these. The memory 112 can include, for example, a random access memory (RAM), a storage device (e.g., a writable read-only memory (ROM) or others), a hard disk, or another type of storage medium. The memory 112 can include various forms of volatile or non-volatile memory, media and memory devices, etc.

Each of the example quantum computing systems 103A, 103B operates as a quantum computing resource in the computing system 101. The other resources 107 may include additional quantum computing resources (e.g., quantum computing systems, —and/or quantum simulators (QVMs)) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the servers 108 generate programs, identify appropriate computing resources (e.g., a QPU or QVM) in the computing system 101 to execute the programs, and send the programs to the identified resources for execution. For example, the servers 108 may send programs to the quantum computing system 103A, the quantum computing system 103B or any of the other resources 107. The programs may include classical programs, quantum programs, hybrid classical/quantum programs, and may include any type of function, code, data, instruction set, etc.

In some instances, programs can be formatted as source code that can be rendered in human-readable form (e.g., as text) and can be compiled, for example, by a compiler running on the servers 108, on the quantum computing systems 103, or elsewhere. In some instances, programs can be formatted as compiled code, such as, for example, binary code (e.g., machine-level instructions) that can be executed directly by a computing resource. Each program may include instructions corresponding to computational tasks that, when performed by an appropriate computing resource, generate output data based on input data. For example, a program can include instructions formatted for a quantum computer system, a simulator, a digital microprocessor, co-processor or other classical data processing apparatus, or another type of computing resource.

In some cases, a program may be expressed in a hardware-independent format. For example, quantum machine instructions may be provided in a quantum instruction language such as Quil, described in the publication "A Practical Quantum Instruction Set Architecture," arXiv: 1608.03355v2, dated Feb. 17, 2017, or another quantum instruction language. For instance, the quantum machine instructions may be written in a format that can be executed by a broad range of quantum processing units or simulators. In some cases, a program may be expressed in high-level terms of quantum logic gates or quantum algorithms, in lower-level terms of fundamental qubit rotations and controlled rotations, or in another form. In some cases, a program may be expressed in terms of control signals (e.g., pulse sequences, delays, etc.) and parameters for the control signals (e.g., frequencies, phases, durations, channels, etc.). In some cases, a program may be expressed in another form or format. Furthermore, a program may utilize Quil-T, described in the publication "Gain deeper control of Rigetti quantum processors with Quil-T," available at https://medium.com/rigetti/gain-deeper-control-of-rigetti-quantum-processors-with-quil-t-ea8943061e5b dated Dec. 10, 2020, incorporated by reference herein.

In some implementations, the servers 108 include one or more compilers that convert programs between formats. For example, the servers 108 may include a compiler that converts hardware-independent instructions to binary programs for execution by the quantum computing systems 103A, 103B. In some cases, a compiler can compile a program to a format that targets a specific quantum resource in the computer system 101. For example, a compiler may generate a different binary program (e.g., from the same source code) depending on whether the program is to be executed by the quantum computing system 103A or the quantum computing system 103B.

In some cases, a compiler generates a partial binary program that can be updated, for example, based on specific parameters. For instance, if a quantum program is to be executed iteratively on a quantum computing system with varying parameters on each iteration, the compiler may generate the binary program in a format that can be updated with specific parameter values at runtime (e.g., based on feedback from a prior iteration, or otherwise)—parametric update being performed without further compilation, as described in more detail below. In some cases, a compiler generates a full binary program that does not need to be updated or otherwise modified for execution.

In some implementations, the servers 108 generate a schedule for executing programs, allocate computing resources in the computing system 101 according to the schedule, and delegate the programs to the allocated computing resources. The servers 108 can receive, from each computing resource, output data from the execution of each program. Based on the output data, the servers 108 may generate additional programs that are then added to the schedule, output data that is provided back to a user device 110, or perform another type of action.

In some implementations, all or part of the computing environment operates as a cloud-based quantum computing (QC) environment, and the servers 108 operate as a host system for the cloud-based QC environment. The cloud-based QC environment may include software elements that operate on both the user devices 110 and the computer system 101 and interact with each other over the wide area network 115. For example, the cloud-based QC environment may provide a remote user interface, for example, through a browser or another type of application on the user devices 110. The remote user interface may include, for example, a graphical user interface or another type of user interface that obtains input provided by a user of the cloud-based QC environment. In some cases, the remote user interface includes, or has access to, one or more application programming interfaces (APIs), command line interfaces, graphical user interfaces, or other elements that expose the services of the computer system 101 to the user devices 110.

In some cases, the cloud-based QC environment may be deployed in a "serverless" computing architecture. For instance, the cloud-based QC environment may provide on-demand access to a shared pool of configurable computing resources (e.g., networks, servers, storage, applications, services, quantum computing resources, classical computing resources, etc.) that can be provisioned for requests from user devices 110. Moreover, the cloud-based computing systems 101 may include or utilize other types of computing resources, such as, for example, edge computing, fog computing, etc.

Figure 13:
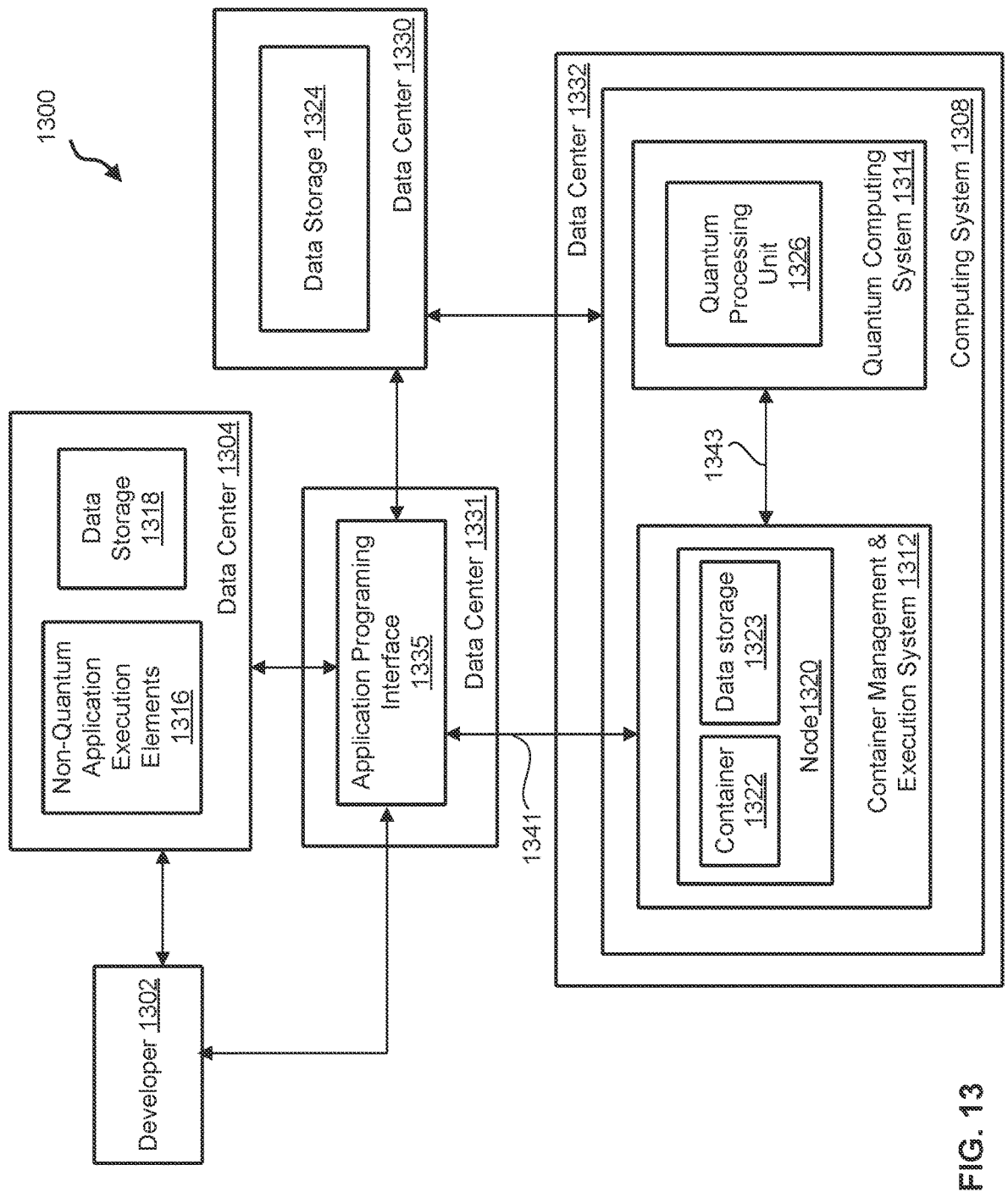
FIG. 13 is a block diagram of a first example of a hybrid quantum/classical computing environment using containers as virtual resources.

In an example implementation of a cloud-based QC environment, the servers 108 may operate as a cloud provider that dynamically manages the allocation and provisioning of physical computing resources (e.g., GPUs, CPUs, QPUs, etc.). Accordingly, the servers 108 may provide services by defining virtualized resources for each user account. For instance, the virtualized resources may be constructed as virtual machines, containers, or virtualized resources that can be provisioned for a user account and in an example implementation may be configured by a user. An example computing system that utilizes containers as virtualized resources is shown in FIG. 13; containers may be utilized in another system architecture. In some cases, the Container Management & Execution System 1312 is implemented using a resource such as, for example, Kubernetes®. Kubernetes® is an example of a software platform for container management. In some cases, the cloud-based QC environment is implemented using a resource such as, for example, OPENSTACK®. OPENSTACK® is an example of a software platform for cloud-based computing, which can be used to provide virtual machine resources and other virtual computing resources for users.

In some cases, the server 108 creates and manages virtualized resources for each user account. One example implementation may operate as a virtual computing resource for users of the cloud-based QC environment. For example, a virtualized resource can provide a development and execution environment to develop and run programs (e.g., quantum programs or hybrid classical/quantum programs). When a virtualized resource operates on the server 108, the virtualized resource may engage either of the quantum processor units 102A, 102B, and interact with a remote user device (110B or 110C) to provide a user programming environment. The virtualized resource may operate in close physical proximity to and have a low-latency communication link with the quantum computing systems 103A, 103B. In some implementations, remote user devices connect with the virtualized resource operating on the servers 108 through secure shell (SSH) or other protocols over the wide area network 115.

In some implementations, all or part of the computing system 101 operates as a hybrid computing environment. For example, quantum programs can be formatted as hybrid classical/quantum programs that include instructions for execution by one or more quantum computing resources and instructions for execution by one or more classical resources. The servers 108 can allocate quantum and classical computing resources in the hybrid computing environment, and delegate programs to the allocated computing resources for execution. The quantum computing resources in the hybrid environment may include, for example, one or more quantum processing units (QPUs), one or more quantum processing simulators (such as the Rigetti Computing QVM), or possibly other types of quantum resources. The classical computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some examples, hybrid classical/quantum algorithms may employ a variational execution model in order to accomplish tasks such as, for example, solving combinatorial optimization problems or simulating quantum chemistry. To execute hybrid classical/quantum algorithms according to this model, the server 108 can generate an initial quantum program (e.g., based on a proposed solution to a problem, starting with an initial guess, etc.), and send the initial quantum program to quantum computer resource (e.g., the quantum computer system 103A, the quantum computer system 103B, a QVM, or a combination of them) for execution. Then, from the output of executing the initial quantum program, a classical optimizer running on the server 108 (or another classical computer resource) may update the quantum program for the next round of iteration on the quantum computer resource. Depending on the difficulty of the problem, the quality of the quantum computer resource, and other factors, the iteration loop may be repeated many times before completing the computational task. In some implementations, low-latency hybrid classical/quantum computing can be achieved, for example, when a virtual machine or container operates on a classical machine that is physically located close to a QPU. The precise distance between virtual machine or container and the QPU is a function of both physical distance and network complexity producing a network latency that may be small (e.g. less than 1 ms in some embodiments, less than 10 ms in other embodiments, less than 100 ns in further embodiments).

In some cases, the servers 108 can select the type of computing resource (e.g., quantum or classical) to execute an individual program, or part of a program, in the computing system 101. For example, the servers 108 may select a particular quantum processing unit (QPU) or other computing resource based on availability of the resource, speed of the resource, information or state capacity of the resource, a performance metric (e.g., process fidelity) of the resource, or based on a combination of these and other factors. In some cases, the servers 108 can perform load balancing, resource testing and calibration, and other types of operations to improve or optimize computing performance.

Each of the example quantum computing systems 103A, 103B shown in FIG. 1 can perform quantum computational tasks by executing quantum machine instructions (e.g., a binary program compiled for the quantum computing system). In some implementations, a quantum computing system can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum computing system can operate using gate-based models for quantum computing. For example, the qubits can be initialized in an initial state, and a quantum logic circuit comprised of a series of quantum logic gates can be applied to transform the qubits and extract measurements representing the output of the quantum computation. Individual qubits may be controlled by single-qubit quantum logic gates, and pairs of qubits may be controlled by two-qubit quantum logic gates (e.g., entangling gates that are capable of generating entanglement between the pair of qubits). In some implementations, a quantum computing system can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation. Other computational regimes may be used; for example, quantum computing systems may operate in non-fault-tolerant regimes. In some implementations, a quantum computing system is constructed and operated according to a scalable quantum computing architecture. For example, in some cases, the architecture can be scaled to a large number of qubits to achieve large-scale general purpose coherent quantum computing. Other architectures may be used; for example, quantum computing systems may operate in small-scale or non-scalable architectures.

The example quantum computing system 103A shown in FIG. 1 includes a quantum processing unit 102A and a control system 105A, which controls the operation of the quantum processing unit 102A. Similarly, the example quantum computing system 103B includes a quantum processing unit 102B and a control system 105B, which controls the operation of a quantum processing unit 102B. A quantum computing system may include additional or different features, and the components of a quantum computing system may operate as described with respect to FIG. 1 or in another manner.

In some instances, all or part of the quantum processing unit 102A functions as a quantum processor, a quantum memory, or another type of subsystem. In some examples, the quantum processing unit 102A includes a quantum circuit system. The quantum circuit system may include qubit devices, readout devices and possibly other devices that are used to store and process quantum information. In some cases, the quantum processing unit 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processing unit 102A. In some cases, the quantum processing unit 102A includes an ion trap system, and the qubit devices are implemented as trapped ions controlled by optical signals delivered to the quantum processing unit 102A. In some cases, the quantum processing unit 102A includes a spin system, and the qubit devices are implemented as nuclear or electron spins controlled by microwave or radio-frequency signals delivered to the quantum processing unit 102A. The quantum processing unit 102A may be implemented based on another physical modality of quantum computing.

The quantum processing unit 102A may include, or may be deployed within, a controlled environment. The controlled environment can be provided, for example, by shielding equipment, cryogenic equipment, and other types of environmental control systems. In some examples, the components in the quantum processing unit 102A operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

In some implementations, the example quantum processing unit 102A can process quantum information by applying control signals to the qubits in the quantum processing unit 102A. The control signals can be configured to encode information in the qubits, to process the information by performing quantum logic gates or other types of operations, or to extract information from the qubits. In some examples, the operations can be expressed as single-qubit quantum logic gates, two-qubit quantum logic gates, or other types of quantum logic gates that operate on one or more qubits. A quantum logic circuit, which includes a sequence of quantum logic operations, can be applied to the qubits to perform a quantum algorithm. The quantum algorithm may correspond to a computational task, a hardware test, a quantum error correction procedure, a quantum state distillation procedure, or a combination of these and other types of operations.

The example control system 105A includes controllers 106A and signal hardware 104A. Similarly, control system 105B includes controllers 106B and signal hardware 104B. All or part of the control systems 105A, 105B can operate in a room-temperature environment or another type of environment, which may be located near the respective quantum processing units 102A, 102B. In some cases, the control systems 105A, 105B include classical computers, signaling equipment (microwave, radio, optical, bias, etc.), electronic systems, vacuum control systems, refrigerant control systems or other types of control systems that support operation of the quantum processing units 102A, 102B.

The control systems 105A, 105B may be implemented as distinct systems that operate independent of each other. In some cases, the control systems 105A, 105B may include one or more shared elements; for example, the control systems 105A, 105B may operate as a single control system that operates both quantum processing units 102A, 102B. Moreover, a single quantum computer system may include multiple quantum processing units, which may operate in the same controlled (e.g., cryogenic) environment or in separate environments.

The example signal hardware 104A includes components that communicate with the quantum processing unit 102A. The signal hardware 104A may include, for example, waveform generators, amplifiers, digitizers, high-frequency sources, DC sources, AC sources, etc. The signal hardware may include additional or different features and components. In the example shown, components of the signal hardware 104A are adapted to interact with the quantum processing unit 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processing unit 102A during operation of the quantum computing system 103A. For instance, the signal hardware 104A may generate signals to implement quantum logic operations, readout operations or other types of operations. As an example, the signal hardware 104A may include arbitrary waveform generators (AWGs) that generate electromagnetic waveforms (e.g., microwave or radio frequency) or laser systems that generate optical waveforms. The waveforms or other types of signals generated by the signal hardware 104A can be delivered to devices in the quantum processing unit 102A to operate qubit devices, readout devices, bias devices, coupler devices or other types of components in the quantum processing unit 102A.

In some instances, the signal hardware 104A receives and processes signals from the quantum processing unit 102A. The received signals can be generated by the execution of a quantum program on the quantum computing system 103A. For instance, the signal hardware 104A may receive signals from the devices in the quantum processing unit 102A in response to readout or other operations performed by the quantum processing unit 102A. Signals received from the quantum processing unit 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processing unit 102A.

In some implementations, the signal hardware 104A includes signal delivery hardware that interfaces with the quantum processing unit 102A. For example, the signal hardware 104A may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processing unit 102A. In some instances, signal delivery hardware performs preprocessing, signal conditioning or other operations on readout signals received from the quantum processing unit 102A.

The example controllers 106A communicate with the signal hardware 104A to control operation of the quantum computing system 103A. The controllers 106A may include classical computing hardware that directly interface with components of the signal hardware 104A. The example controllers 106A may include classical processors, memory, clocks, digital circuitry, analog circuitry, and other types of systems or subsystems. The classical processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory or another type of computer storage medium. The controllers 106A may also include one or more communication interfaces that allow the controllers 106A to communicate via the local network 109 and possibly other channels. The controllers 106A may include additional or different features and components.

In some implementations, the controllers 106A include memory or other components that store quantum state information, for example, based on qubit readout operations performed by the quantum computing system 103A. For instance, the states of one or more qubits in the quantum processing unit 102A can be measured by qubit readout operations, and the measured state information can be stored in a cache or other type of memory system in or more of the controllers 106A. In some cases, the measured state information is subsequently used in the execution of a quantum program, a quantum error correction procedure, a quantum processing unit (QPU) calibration or testing procedure, or another type of quantum process.

In some implementations, the controllers 106A include memory or other components that store a quantum program containing quantum machine instructions for execution by the quantum computing system 103A. In some instances, the controllers 106A can interpret the quantum machine instructions and perform hardware-specific control operations according to the quantum machine instructions. For example, the controllers 106A may cause the signal hardware 104A to generate control signals that are delivered to the quantum processing unit 102A to execute the quantum machine instructions.

In some instances, the controllers 106A extract qubit state information from qubit readout signals, for example, to identify the quantum states of qubits in the quantum processing unit 102A or for other purposes. For example, the controllers may receive the qubit readout signals (e.g., in the form of analog waveforms) from the signal hardware 104A, digitize the qubit readout signals, and extract qubit state information from the digitized signals. In some cases, the controllers 106A compute measurement statistics based on qubit state information from multiple shots of a quantum program. For example, each shot may produce a bitstring representing qubit state measurements for a single execution of the quantum program, and a collection of bitstrings from multiple shots may be analyzed to compute quantum state probabilities.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some implementations, the controllers 106A may include classical computer resources that perform some or all of the operations of the servers 108 described above. For example, the controllers 106A may operate a compiler to generate binary programs (e.g., full or partial binary programs) from source code; the controllers 106A may include an optimizer that performs classical computational tasks of a hybrid classical/quantum program; the controllers 106A may update binary programs (e.g., at runtime) to include new parameters based on an output of the optimizer, etc.

The other quantum computer system 103B and its components (e.g., the quantum processing unit 102B, the signal hardware 104B and controllers 106B) can be implemented as described above with respect to the quantum computer system 103A; in some cases, the quantum computer system 103B and its components may be implemented or may operate in another manner.

In some implementations, the quantum computer systems 103A, 103B are disparate systems that provide distinct modalities of quantum computation. For example, the computer system 101 may include both an adiabatic quantum computer system and a gate-based quantum computer system. As another example, the computer system 101 may include a superconducting circuit-based quantum computer system and an ion trap-based quantum computer system. In such cases, the computer system 101 may utilize each quantum computing system according to the type of quantum program that is being executed, according to availability or capacity, or based on other considerations.

Figure 2:
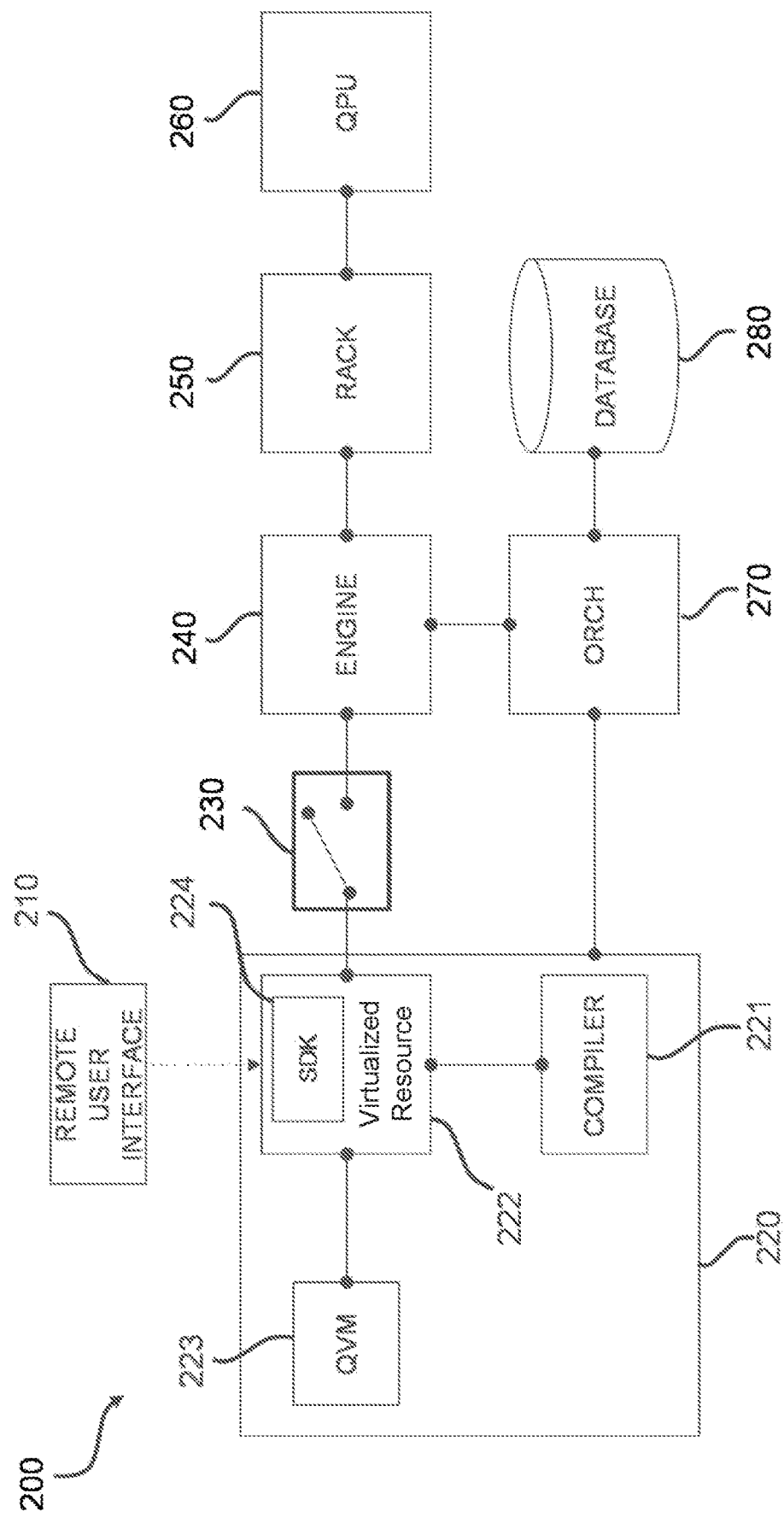
FIG. 2 is a schematic representation of an example low-latency computing system.

FIG. 2 is a schematic representation of an example low-latency computing system 200. In some implementations, elements of the example computing environment 100 shown in FIG. 1 can be cast with an architecture illustrated by the example system 200 shown in FIG. 2. The example system 200 shown in FIG. 2 includes a remote user interface 210 connected to a virtualized resource 222 in a host server 220 via a communication link, which may be via the cloud, the internet, or some other communication link. For example, the remote user interface 210 in FIG. 2 may be provided on one of the remote user devices 110B, 110C in FIG. 1; the host server 220 in FIG. 2 may be implemented as one or more of the servers 108 in FIG. 1; and the user interface 210 may communicate with the virtualized resource 222 via the wide area network 115 in FIG. 1.

The example host server 220 shown in FIG. 2 includes a virtualized resource 222, which includes a programming environment and software development kit (SDK) 224. The host server 220 further includes a compiler 221 which allows the virtualized resource 222 to convert device-independent quantum programs (e.g., Quil programs) into binary programs that can be sent to the engine 240 for execution. In the example shown in FIG. 2, the host server 220 includes a Quantum Virtual Machine (QVM) 223, which allows the virtualized resource 222 to classically simulate the execution of quantum programs. In some implementations, the SDK includes a QVM (e.g., for simulating smaller numbers of qubit; say less than 30 qubits). In some implementations, the QVM can operate on a separate high-performance computer that allows for simulating large number of qubits, for example, greater than 30 qubits. The compiler 221 can operate on a separate server, as part of the virtualized resource 222 on the host server 220, or otherwise.

In some cases, when the virtualized resource 222 operates on the host server 220, the virtualized resource 222 provides a virtualized execution environment for quantum programs (which may include hybrid classical/quantum programs). The virtualized representation of the execution environment allows many user accounts to concurrently utilize the hardware resources in the computing system 200 (e.g., rather than allocating distinct hardware elements to each user account). For instance, virtualized representations may provide each user account a respective virtualized resource 222 that can be loaded on the host server 220 (e.g., concurrently) to access a collection of virtual resources (e.g., classical processors, memory, operating system, applications, etc.).

In some cases, the virtualized resource 222 may be implemented as a virtual machine image that operates on virtual computing resource such as, for example, a virtual machine or a container. In some cases, the virtualized resource 222 may be stored (e.g., as one or more files on the host server 220 or a storage server), for example, to save a configuration of an execution environment. For instance, a virtualized resource 222 can be stored with default configuration settings, with user-defined configuration settings, or otherwise. Thus, the virtualized resource 222 may represent a preconfigured execution environment.

The example system 200 shown in FIG. 2 includes an engine 240, a rack 250 and a QPU 260, which may operate together to form all or part of one or more quantum computing systems. For instance, the engine 240 in FIG. 2 may be implemented as described with respect to the controller 106A in FIG. 1; the rack 250 in FIG. 2 may be implemented as described with respect to the signal hardware 104A in FIG. 1; and the QPU 260 in FIG. 2 may be implemented as described with respect to the QPU 102A in FIG. 1.

The engine 240 may include instrument drivers and other components that operate to manage the rack 250 and broker communications with the QPU 260. The rack 250 generates control signals (e.g., radio, microwave, optical, DC, etc.) that control the elements of the QPU 260. The QPU 260 can include, for example, a superconducting quantum integrated circuit comprising an array of qubits and resonators or another type of quantum hardware. The QPU 260 may be kept in a cryogenic environment (e.g., maintained by a dilution refrigerator) or another type of controlled environment during operation.

As shown in FIG. 2, the example host server 220 is connected to the QPU 260 through a low-latency switchable link 230, which is represented in FIG. 2 as a switch with an open and a closed position. The switchable link 230 can be implemented in software (e.g., as a virtual switch), firmware, hardware, or otherwise. In some cases, the switchable link 230 provides a connection to a high-speed Ethernet cable or another kind of wired communication link. As shown in FIG. 2, the switchable link 230 provides a communication channel between the host server 220 and the engine 240.

In some example systems, the physical connections between the host server 220 and the engine 240, between the engine 240 and the rack 250, and between the rack 250 and the QPU 260 form a low-latency communication pathway between the virtualized resource 222 and the QPU 260. The physical connections may be provided, for example, by a 10 Gb (gigabit) Ethernet that falls within one or more of the IEEE 802.3 working group standards (e.g., IEEE 802.3-2015). For instance, the connections from the rack 250 to the QPU 260 may include 2×10 Gb Ethernet connections with a single mode fiber going to every fridge, configured in an active-active bond. The equipment in the rack 250 may include a Cisco Nexus 3 k, which may be connected to the host server 220 with direct-attached SFP cables (e.g., DAC cables). The fridge rack may include Cisco SG550XG switches connected to the control equipment with DAC cables as well. In some cases, SFP+ transceivers may be used. Such equipment may operate in the system 200 as a communication channel that provides a low-latency communication pathway from the host server 220 to the engine 240, the rack 250 and the QPU 260.

The example system 200 shown in FIG. 2 includes an orchestrator 270 and a database 280, which may be implemented using classical computing resources. For instance, the orchestrator 270 and the database 280 in FIG. 2 may be implemented on one or more servers or controllers (e.g., the servers 108, controllers 106A, 106B in FIG. 1) or another type of system. The example orchestrator 270 facilitates communication between the virtualized resource 222 and the engine 240. In some implementations, the orchestrator 270 can be in a separate server. As shown in FIG. 2, the orchestrator 270 may communicate with the database 280. The database 280 stores information that may be utilized by the compiler 221 and quantum engine 240, for example, configuration and calibration information for the QPU 260 and other types of information.

In some aspects of operation, a secured connection is established between the host server 220 and the remote user interface 210. For instance, the secured connection may be established by SCP (e.g., by SSH) over a public communication channel such as, for example, the Internet. The virtualized resource 222 operating on the host server 220 generates programs in response to instructions received from the remote user interface 210 over the secured connection. The programs and related data may be communicated over low-latency communication pathways between the host server 220, the engine 240, the rack 250 and the QPU 260. The programs are executed by the QPU 260, and results of program executions (e.g., measurement outcomes, etc.) may be sent to the virtualized resource 222 over the low-latency communication pathway.

In some instances, low-latency hybrid classical/quantum programming can be enabled by placing the user's programming environment physically close to the QPU 260. In some cases, this proximity is enabled by allowing users to SSH from their remote user interface 210 anywhere in the world (e.g., from a distance that may be orders of magnitude greater than 1.0 km) to their virtualized resource 222, which is located in close physical proximity to the QPU 260 (e.g., less than 1.0 km or 0.5 km from the QPU 260). In some cases, where engagement with the QPU 260 is a scarce event due to limited quantum resources, not every user can simultaneously have access to the QPU 260. When a user's virtualized resource 222 has access to a quantum resource, then the user's virtualized resource 222 is QPU-engaged. Otherwise, the virtualized resource 222 is disengaged. In some implementations, the engagement process is comprised of a defined list of tasks that allows the virtualized resource 222 to obtain access to the quantum resource. In some cases, if there are enough quantum resources, the engagement process can be automatic.

In some implementations, once a user's account is connected to the virtualized resource 222, the user may develop quantum programs (which may include hybrid classical/quantum programs), for example, using quantum instruction languages (e.g., Quil). The generated quantum programs are not necessarily readable by the electronics in the rack 250. In some implementations, the quantum programs are transformed into instrument commands before the programs can be used to manipulate the state of the QPU 260. A quantum compilation process can take a quantum program as input and produce instrument binaries as output. For example, the quantum compilation process can be done by the compiler 221 in FIG. 2 and passed on to the engine 240, which may directly communicate the outputs to the rack 250.

Figure 6:
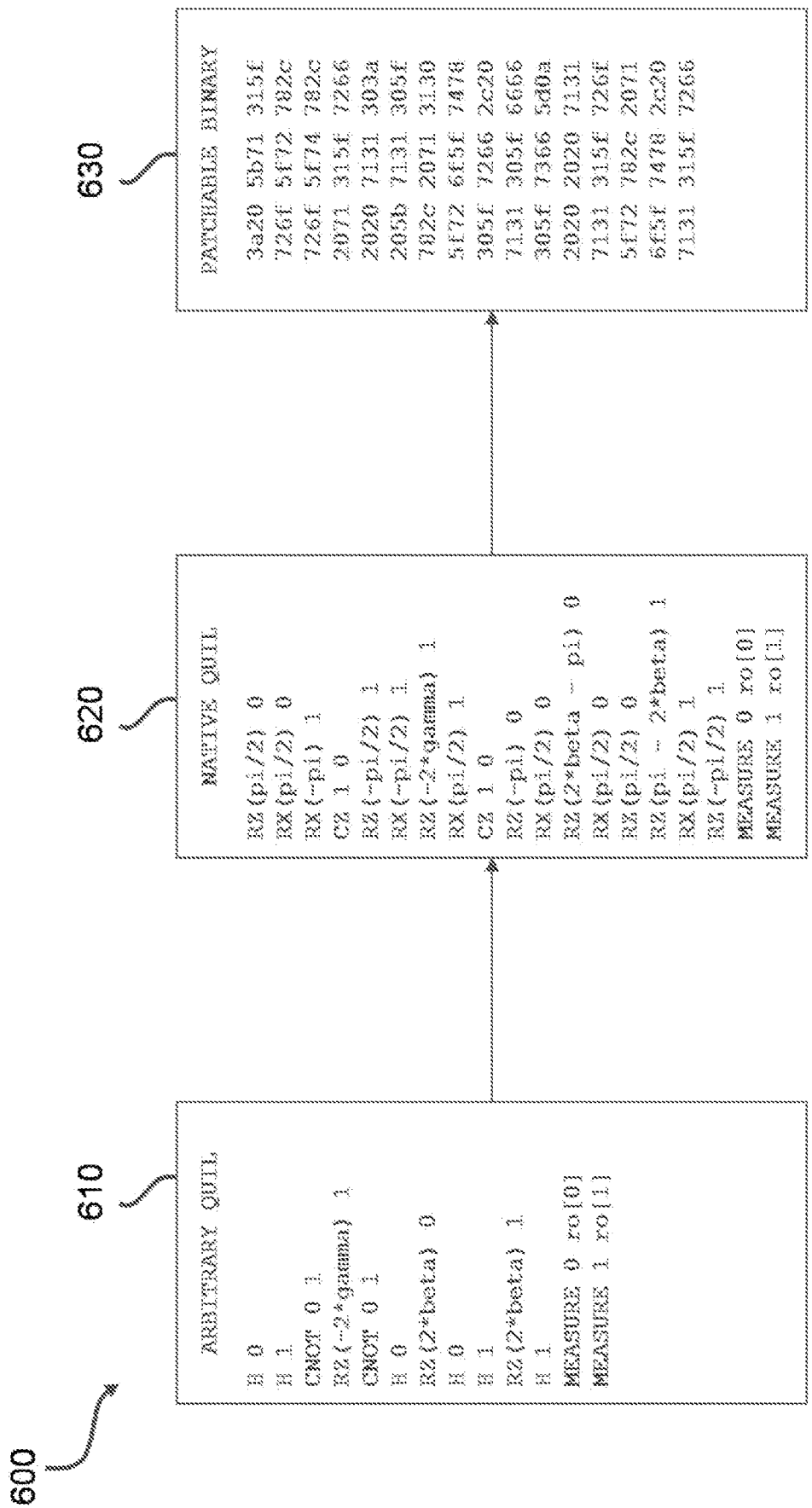
FIG. 6 shows an example binary compilation process.
Figure 7:
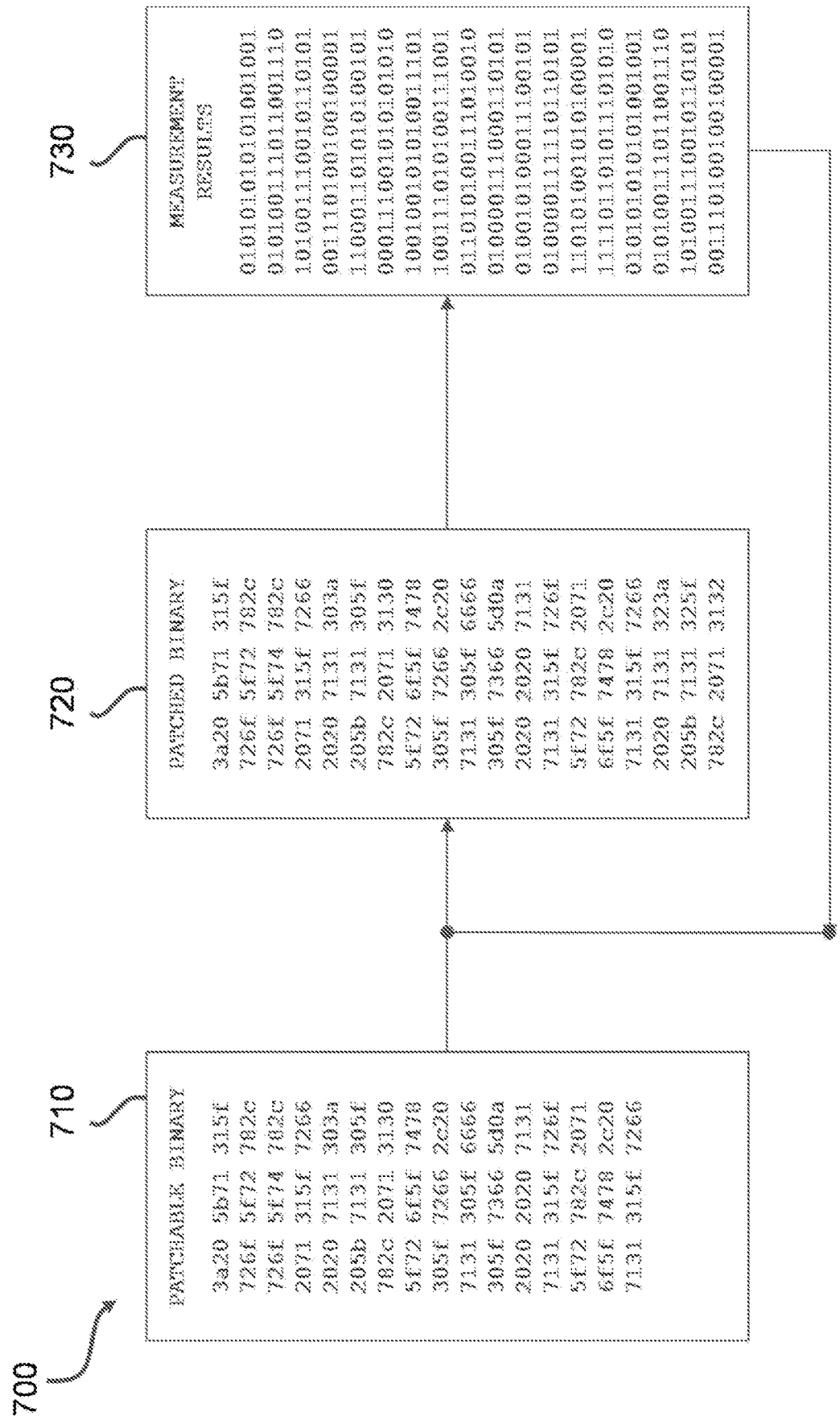
FIG. 7 is a diagram of an example fast hybrid execution process.

The virtualized resource 222 may become QPU-engaged by establishing a connection with the QPU 260 (e.g., by closing the switchable link 230). When the virtualized resource 222 is QPU-engaged and the compiler 221 has compiled the quantum program into instrument binaries, the virtualized resource 222 may obtain access to the engine 240 where the instrument binaries are loaded and run. In the computing system shown in FIG. 2, the run time can be optimized for hybrid classical/quantum execution, for example, using binary patching and possibly other techniques. Binary patching can be accomplished, for example, by updating a partial binary program for execution (e.g., by filling in an incomplete data memory section of an instrument binary that has instructions in its instruction memory that reference incomplete entries in that data memory section). An example binary patching process is shown in FIGS. 6 and 7; binary patching may be implemented in another manner in some cases.

Figure 12:
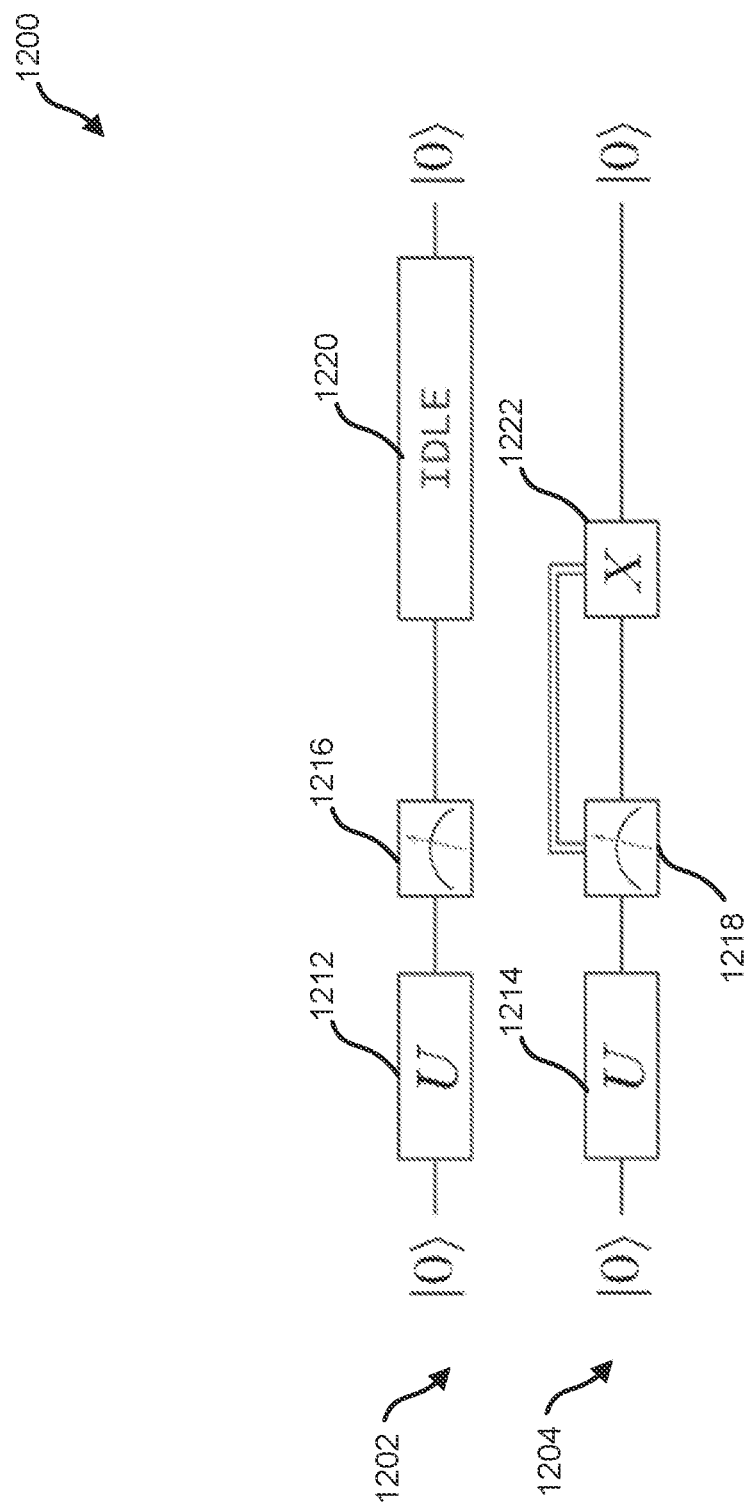
FIG. 12 is a quantum logic circuit diagram showing example qubit reset operations.

In some implementations, low-latency hybrid execution may be enhanced by an active reset process or another process that quickly sets all or individual qubits in the QPU 260 to a fiducial state (e.g., the ground state or another basis state). Such an active reset process may reduce the delay between running successive programs on the QPU 260, by as much as an order of magnitude in some instances. An example active reset process is shown in FIG. 12; fast reset may be implemented in another manner in some cases.

Figure 3:
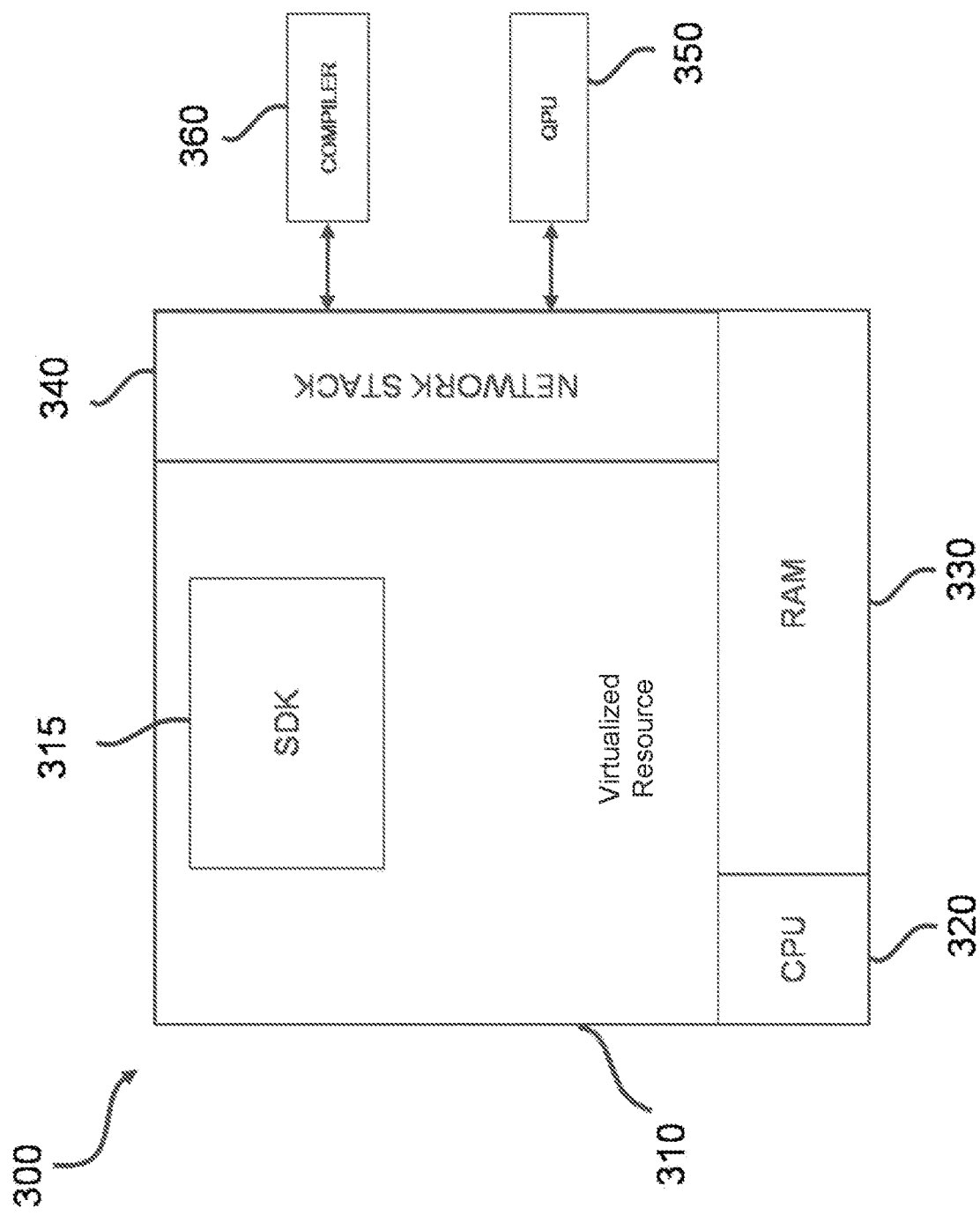
FIG. 3 is a schematic representation of an example virtualized resource configuration.

FIG. 3 is a schematic representation of an example virtualized resource configuration 300. The example virtualized resource configuration 300 shown in FIG. 3 includes a classical processing unit (CPU) 320 that is powerful enough to perform mathematical optimization routines such as Nelder-Mead, for example, rapidly enough to be within the hybrid classical/quantum program execution loop, or to perform post-processing/analysis on data taken from the QPU 350. For more information on Nelder-Mead, see, for example, the 1965 publication entitled "A simplex method for function minimization" by Nelder and Mead. The virtualized resource configuration 300 also includes a virtualized resource 310 that includes a quantum software development kit (SDK) 315. In some implementations, where each user account has a virtualized resource 310 and resource latency is important, the virtualized resource 310 can be packaged as a virtual machine image. Packaging the virtualized resource 310 as a virtual machine image may facilitate easy replication and migration of the virtualized resource 310. In some case, virtual packaging allows full control of an underlying network stack 340 and classical resources (e.g., random access memory (RAM) 330 and classical processing unit (CPU) 320).

In some cases, the underlying machine architecture being targeted by a quantum compiler is not static. Thus, the virtualized resource 310 can be configured/reconfigured according to the quantum resource that is being targeted for execution. The configuration information may be accessed from a database (e.g., the database 280 shown in FIG. 2). In the example shown, the virtualized resource 310 is deployed on-premises with the QPU 350, to allow the virtualized resource 310 to establish low-latency access to the QPU. In some implementations, hybrid classical/quantum programming benefits from a tight coupling between the QPU 350 and the CPU 320 (e.g., to perform optimization over a parameter space), so a short-distance high-speed, high-bandwidth network connection may be used; for example, with a high-speed, high-bandwidth network connection between the QPU 350 and the CPU 320, these two processors can be co-located anywhere in the same facility (and perhaps even be up to roughly 1 km apart) and have a low-latency connection with each other.

In some implementations, when users have access to a preconfigured quantum programming environment (such as, for example, PYQUIL®) on the virtualized resource 310, they can build quantum programs, compile them to instrument binaries using a compiler 360, and execute them on the QPU 350. In some cases, in order to further accelerate the classical optimization component of the hybrid classical/quantum programming loop, a graphical processing unit (GPU) (not shown) can be leveraged in addition to the CPU 320. For instance, the GPU may be deployed as one of the other resources 107 in FIG. 1 or otherwise. In some instances, (e.g., when quantum resources are scarce), the virtualized resource 310 can access a simulator (e.g., the QVM 223 shown FIG. 2) as a development tool to test or debug their quantum programs between scheduled QPU access time. In some cases, the virtualized resource 310 can run a quantum program on the QVM to benchmark the quantum program. In addition to the base quantum programming environment, the virtualized resource 310 can include a quantum SDK 315 with tools for composing quantum programs for various applications, for example, for quantum chemistry simulations or machine learning. For example, the quantum SDK 315 may include resources such as Grove, which is a python library comprised of a suite of canonical quantum algorithms, such as Grover's search algorithm and benchmarking routines such as quantum process tomography. Other examples of applications that may be suitable for an SDK are ProteinQure (a tool for protein folding on top of Quil) and pyGSTi (a python library for building gate set tomography programs).

In some implementations, additional high-performance computing resources can be used for some applications of quantum computing, for example, where the post processing and analysis of data output from the QPU is more (classical) resource intensive than is practical to provide on every virtualized resource. This problem can be mitigated by providing access to an external high-performance computing (HPC) cluster on which data analysis jobs can be scheduled. In some cases, in addition to the on-virtualized resource storage that user accounts have for their transient QPU data, users can have the option of storing results in a persistent data storage system, which may be a centralized high-performance system.

In some implementations, the virtualized resource 222 is allocated to a user account when a new user signs up. A user account may be associated with a user identification, a user e-mail address, an IP address, or another type of identifier. When a user signs up for a user account to access service on the computing system 200, a notification may be sent to the orchestrator 270, which may initiate the allocation process. For example, like a virtual machine, the virtualized resource 222 can be partitioned from a base operating system (OS) image and may be allocated some collection of classical resources (e.g., CPU cores, RAM, and disk space). The partitioning and the allocation generally occur on one of the servers that is used for storing virtualized resources. Once the image has been partitioned and classical resources have been allocated, then the quantum programming environment and potentially SDK 224 can be installed or loaded. In some implementations, the network stack is configured such that the virtualized resource 222 can be accessible from the internet via SSH or secure copy protocol (SCP) and such that it can communicate with the other components of the computing system 200.

In some implementations, virtualized resource upgrades can be done while the computing system 200 is down or at other times. In some cases, the compiler 221 or QVM 223 can be upgraded without interacting with the virtualized resource 222. For other components (e.g., the SDK 224), users can be responsible for maintaining or upgrading versions as necessary. Upgrades and system maintenance may be provided in another manner.

Figure 4:
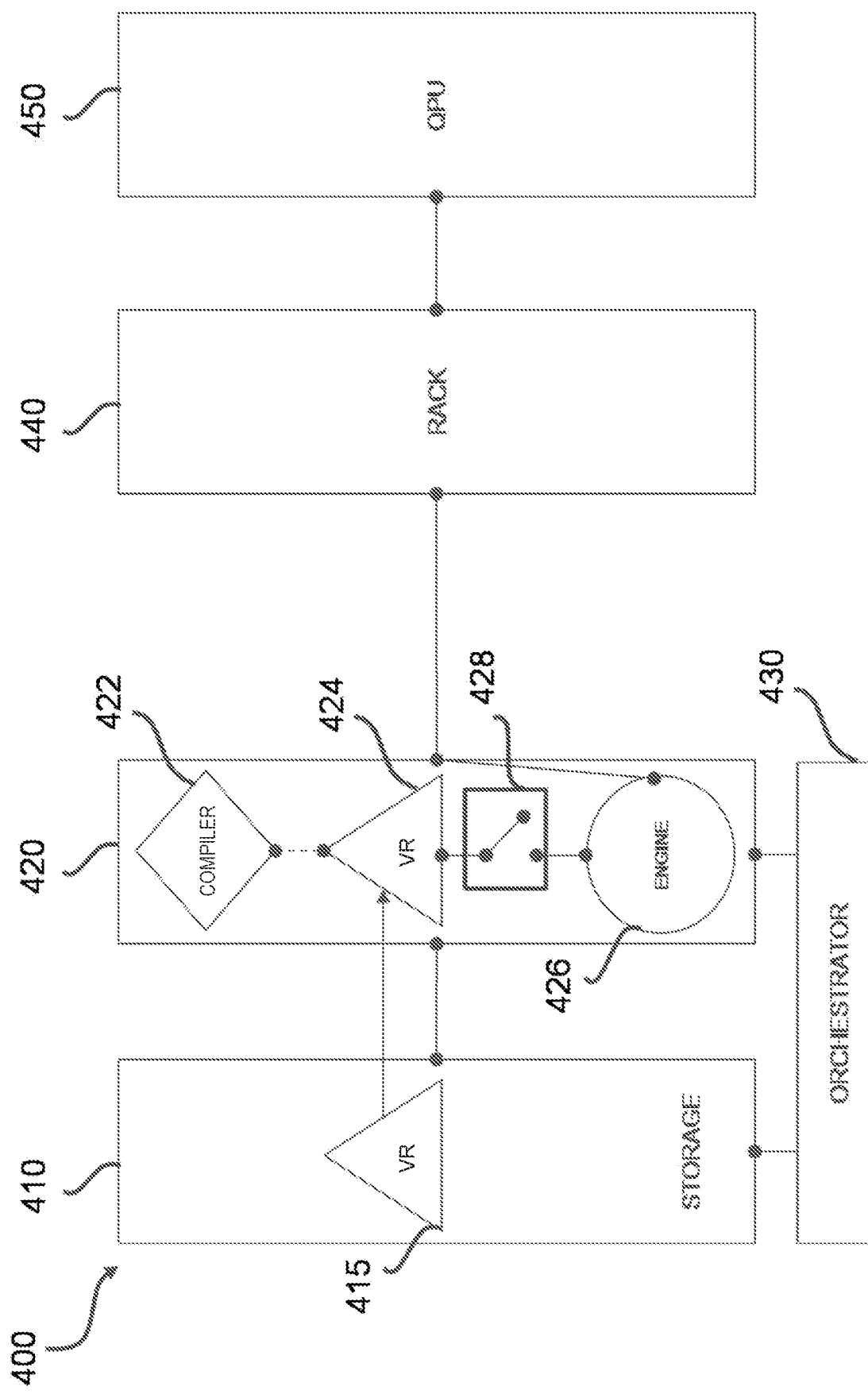
FIG. 4 is a schematic representation of an example quantum processing unit (QPU) engagement process.

FIG. 4 is a schematic representation of an example quantum processing unit (QPU) engagement process 400. The example QPU engagement process 400 shown in FIG. 4 includes a storage server 410 which includes a virtualized resource (VR) 415. The storage server 410 can be located remote from the low-latency compute server 420; for example, the storage server 410 may be located at a data center. When the virtualized resource 415 resides on the storage server 410, the virtualized resource 415 is accessible through a wide area network (e.g., from the Internet), but may not have access to the full suite of compute resources of a quantum-enabled computer system (e.g., the computing system 101 in FIG. 1, the computing system 200 in FIG. 2), and the virtualized resource 415 on the storage server 410 will not have a low-latency link to the QPU 450. An engagement process may be executed to enable access to some of these resources, and QPU engagement may be executed to enable access to a quantum resource (e.g., QPU 450).

In some implementations, the QPU engagement process includes moving the virtualized resource 415 from the storage server 410 to the low-latency compute server 420.

For example, a virtualized resource stored on a remote server can be moved on-premises to a low-latency compute server when a user account is engaged. In the example shown in FIG. 4, the storage server 410 has slower access, is less powerful, and is optimized for storage, whereas the low-latency compute server 420 has faster access, is more powerful, may have a local network connection to the rack 440, and may be optimized for low-latency execution. The QPU engagement process may include moving the virtualized resource 415 from the storage server 410 to the low-latency compute server 420 and connecting the virtualized resource 415 to the QPU 450. The QPU engagement process may further include updating the virtualized resource with the operating points and parameters of the QPU 450. This update may initiate due to changes in the underlying quantum instruction set architecture (ISA), a change in the QPU 450 that the instrument rack 440 is accessing, a change in the characteristics of the QPU 450, or a combination of these and other factors. When the virtualized resource 424 becomes engaged with a QPU 450, the compiler 422 and the quantum execution engine 426 can be reconfigured to target the ISA, the rack 440, and calibration specifications (e.g., operating points, pulses, etc.) for that particular QPU 450. The orchestrator 430 can perform restarting, along with providing appropriate configuration information to the compiler 422 and the quantum execution engine 426. The QPU engagement process may further include allowing network communication between the virtualized resource 424 and the rack 440 corresponding to the QPU 450 that the virtualized resource 424 has engaged. The orchestrator 430 may facilitate communication between the virtualized resource 420 and the rack 440. For example, radios in the rack 440 can be Ethernet devices that are all connected to the same Ethernet switch 428, for example, forming a subnet. The subnet may be inaccessible from the user device by default, and the subnet may become accessible to the user device when the user's virtualized resource is engaged, in some implementations.

In some implementations, a computing environment can be configured to optimize a particular type of execution. For example, a computing system can be configured/reconfigured to emphasize MAXCUT-style parametrized ansatz hybrid classical/quantum programs that involve a (classical) optimization loop. Hybrid classical/quantum programs with a MAXCUT-style parametrized ansatz can be run faster on a computing system when the overall structure of the programs does not change between runs, for example. In some implementations, only the angle parameters that define the cost function or the variational state change from run-to-run, avoiding changing the overall pulse program on the QPU. After compilation, the angle parameter differences can be resolved entirely in software on a CPU. In some cases, low-latency execution of these and other types of hybrid classical/quantum program may be achieved using a combination of binary patching, active reset, and fast classical feedback.

Figure 5:
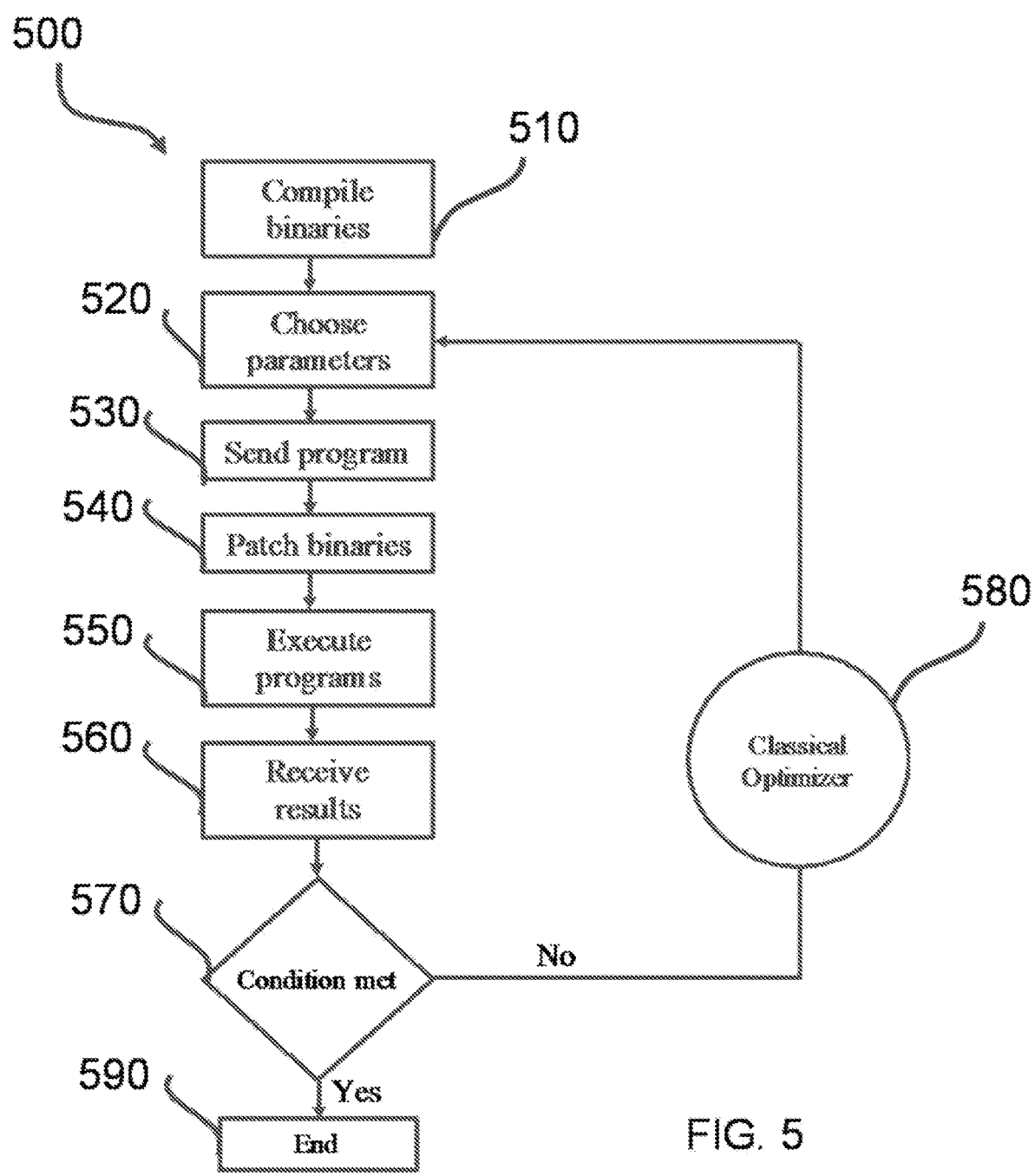
FIG. 5 is a flow chart showing an example hybrid classical/quantum program execution process.

FIG. 5 is a flow chart showing an example hybrid classical/quantum program execution process 500. In some instances, the process 500 can be used to optimize or otherwise improve execution of a hybrid classical/quantum program such as, for example, a MAXCUT-style parametrized ansatz hybrid classical/quantum program. The process 500 may include additional or different operations, and in some cases, one or more of the operations may be performed in a different order. In some cases, one or more operations are repeated or iterated, for example, until a terminating condition is reached. In some cases, multiple operations can be combined or performed in parallel, or individual operations can be divided into multiple sub-operations.

The example process 500 can be performed by a computer system; for example, parts may be executed by a classical computer system, while other parts may be executed by a quantum computer system. The example process 500 can be controlled by a virtualized resource operating on a classical computer system. For instance, in the example system 200 shown in FIG. 2, the virtualized resource 222 may control the process 500 and utilize classical computing resources of the host server 220 or the engine 240, as well as the quantum computing resources provided by the QPU 260.

At 510, a quantum program written in a quantum instruction language is compiled to a set of parametric instrument binaries to form a binary program. For example, a quantum program written in Quil may be converted to a binary program by compiling the quantum program to parametric instrument binaries. At 520, a desired parameter set is accessed for collection of desired parameters. At 530, the parametric instrument binaries corresponding to the compiled quantum program are sent to a quantum computer system for execution (e.g., to an engine that provides access to a QPU). At 540, the parametric/patchable binaries are filled in with the desired parameters for the current run. At 550, the quantum program is executed on the QPU. At 560, the results of the execution at 550 by the QPU are received by the virtualized resource. At 570, a decision engine determines whether further runs are necessary to satisfy the termination condition or whether the condition has already been reached. If the condition has already been reached, the loop is exited and the process ends at 590. If the condition has not been met, the process 500 proceeds to classical optimization at 580. At 580, using the results received at 560, an optimization engine performs classical optimization to compute the parameters for the next run. The new parameters are then chosen at 520, providing the desired parameter set, and the loop is repeated.

In some implementations, operations 520, 530 and 540 can be collapsed into the step of loading the parametric program onto the instruments once for all subsequent executions. In some cases, within each iteration only the parameter memory section of the binary program is updated, which can further reduce the time required to load settings onto the instruments.

In some implementations, parametric compilation may be used, for example, in the hybrid execution model represented by the process 500 or in other contexts. In some instances, parametric compilation includes two types of processes: (1) generating native programs, for example, using Quil, and (2) generating parametric binaries from the native programs. In general, programs written in Quil may not be directly implementable on actual QPUs. The programs in Quil can be referred to as being written in arbitrary Quil. The quantum programs can be written using different instruction languages. The space of potential quantum programs generally is quite large and grows quickly with the number of qubits. Mapping between a quantum instruction and its corresponding instrument instruction for some instructions can be complicated. Due to the underlying mathematical nature of quantum programs, arbitrary Quil can be compiled into a much smaller set of quantum instructions, referred to as native Quil. However, when Quil programs that contain values determined at runtime (as opposed to compile time), the process can be complicated. In some implementations, parameters may be propagated for single-qubit gates by leveraging Euler decomposition or other techniques. For more information on Euler decomposition, see, for example, the 2006 publication entitled "Quantum Gate Decomposition Algorithms" by Alexander Slepoy; or the 2002 publication entitled "Fast, Arbitrary BRDF Shading for Low-Frequency Lighting Using Spherical Harmonics," by Jan Kautz, et al.

Once the native Quil is generated, the second part of parametric compilation can be performed. In some implementations, for every native Quil instruction, the quantum compiler knows the corresponding calibration information to fetch and instrument instructions to perform. Therefore, native Quil can be compiled into a collection of parametric binaries, which have the values for their parameters set at runtime.

FIG. 6 shows an example binary compilation process 600. The binary compilation process 600 can be run on a classical computer system (e.g., on the servers 108 or controllers 106A, 106B shown in FIG. 1). The example binary compilation process 600 in FIG. 6 is described with respect to an example quantum program implementation of a MAXCUT quantum approximate optimization algorithm (QAOA), which is a hybrid classical/quantum program that can take advantage of a fast feedback between the QPU and classical computing resources to quickly search a parameter space. To run MAXCUT QAOA on a QPU, a user device may establish a secured connection (e.g., via SSH) to a virtualized resource and book time on the QPU. For example, a user at the user device may initiate these actions through command line interface (CLI) or a graphical user interface (GUI). The virtualized resource may be engaged with the QPU, for example, by migrating the virtualized resource to an on-premises server in close proximity to the QPU, and connecting the virtualized resource to the engine associated with the QPU (e.g., by closing one or more switchable links on the on-premises server, the engine or a communication channel between them). In some cases, when the virtualized resource is QPU-engaged, binary compilation may be performed as a step in the process of running hybrid classical/quantum programs. In some implementations, the binary compilation process occurs one time for each scheduled run of a hybrid classical/quantum program. For example, for two qubit MAXCUT QAOA, a single round of these steps may be sufficient in some cases.

In the example binary compilation process 600 in FIG. 6, an arbitrary Quil program 610 includes the raw MAXCUT program instructions written in arbitrary Quil. The arbitrary Quil program 610 specifies certain quantum logic gates like a Hadamard gate (H) and a controlled-NOT (CNOT) gate, which may not be directly implementable on the QPU, but nonetheless are valid Quil quantum logic gates. The arbitrary Quil program 610 may be compiled to native Quil program 620, which is specific to the quantum logic operations that can be executed on the QPU. The native Quil program 620 may then be compiled to an updatable (partial) binary program 630 (labeled as "patchable binary" in FIG. 6). The example updatable binary program 630 shown in FIG. 6 is an instrument binary that includes an instruction memory section and a data memory section; the instruction section references the data memory section, and the data memory section has not been completed. The data memory section can be completed or otherwise updated (e.g., "patched") from run to run in order to rapidly iterate over a parameter space. The updatable binary program 630 is an example of a parametric/patchable binary.

FIG. 7 is a diagram of an example fast hybrid execution process 700. As shown in FIG. 7, the execution process 700 begins with an updatable binary program 710 (labeled as "patchable binary" in FIG. 7), which is the updatable binary program 630 from FIG. 6. In the example MAXCUT program represented in FIG. 6, the formal parameters of the single-qubit RZ gates (quantum logic gates that perform a rotation about the Z-axis of the Bloch sphere) are the only parameters that need to be modified from run to run. Thus, the binaries that represent the MAXCUT program can be compiled once and patched with the parameter values between runs. In particular, the updatable binary program 710 can be updated with these parameter values to produce the updated binary program 720 (labeled as "patched binary" in FIG. 7). In the example shown, the parameter values are appended to the end of the updatable binary program 710 to form the updated binary program 720. An updatable binary program may be updated in another manner, for example, inserting parameter values or other information in another section of the program. As shown in FIG. 7, the updated binary program 720 is executed on a QPU, and the execution produces output data represented by the measurement results 730. For instance, the measurement results may include a bitstring representing measurements of individual qubits in the QPU. One or more of such measurement results may be obtained before the parameter values of the quantum program are updated, for example, by the virtualized resource or otherwise. In some cases, the beta and gamma parameters of the MAXCUT program shown in FIG. 6 determine the amount of rotations on qubit phases. When a virtualized resource is QPU-engaged (e.g., as shown in FIG. 4), it may be located in close proximity (low-latency position) relative to the QPU, and thus the virtualized resource can quickly determine the parameters for the following run based on the quantum measurement results 730 of the previous run.

In some implementations of the example hybrid execution process 700, the updatable binary program 710 can be loaded onto a shared memory in a rack (e.g., the rack 250 in FIG. 2, the rack 440 in FIG. 4, etc.) of the quantum computing system, and updated binary program 720 can be produced by directly writing parameter values to the shared memory in the rack. In some implementations of the example hybrid execution process 700, the updatable binary program 710 can be combined with the parameter values on the execution engine (e.g., the engine 240 in FIG. 2, the quantum execution engine 426 in FIG. 4, etc.) and stored locally to form the updated binary program 720; then the updated binary program 720 can be loaded onto the rack (e.g., the rack 250 in FIG. 2, the rack 440 in FIG. 4, etc.) of the quantum computer system. In either case, the use of low-latency communication channels (e.g., between the virtualized resource, the engine, the rack, the QPU, etc.) can reduce the time duration between (1) the time when the virtualized resource issues an instruction to generate the updated binary program 720, and (2) the time when the updated binary program 720 can affect the course of the hybrid classical/quantum program execution; for instance, the time duration may be reduced to sub-coherence time (e.g., less than the coherence time of qubits defined in the QPU).

Figure 8:
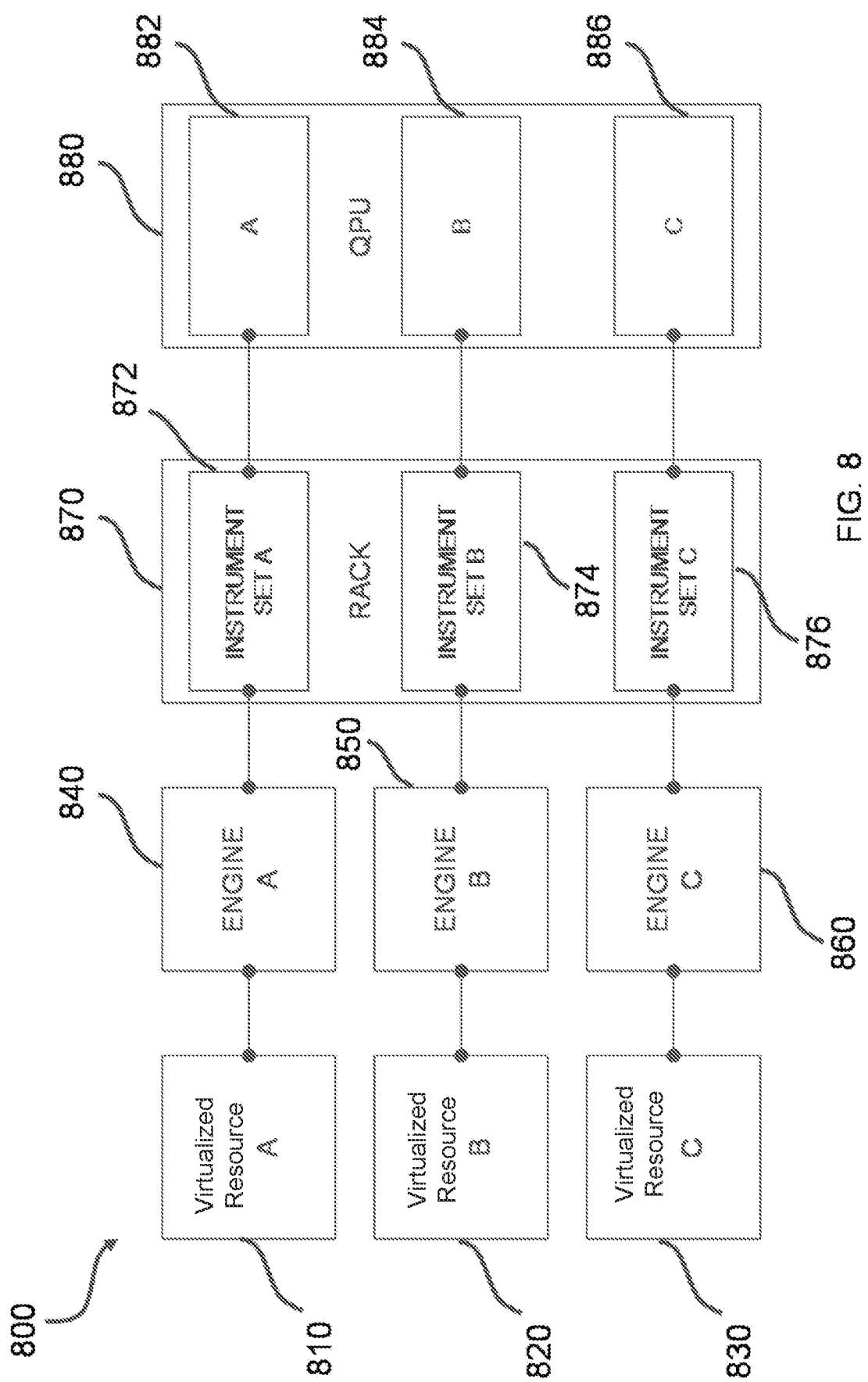
FIG. 8 is a schematic representation of an example multitenancy computing system.

FIG. 8 is a schematic representation of an example multitenancy computing system 800. In some cases, a multitenancy system refers to a computing system in which several virtualized resources (e.g., virtualized resources associated with distinct user accounts) are all QPU-engaged and have access to the same QPU 880 in parallel. In some cases, such access to a QPU can be realized by creating a configuration of qubit and qubit-qubit links, for example, within a chip in the QPU. In some implementations, QPU multitenancy can be provided by a computing system in which several users can have access to the same hardware resource (e.g., the same chip) in a single QPU (e.g., simultaneously or otherwise). In some cases, a computing system can be modified to provide QPU multitenancy capabilities.

In the example multitenancy computing system 800 shown in FIG. 8, three virtualized resources 820, 820, and 830 are shown as simultaneously QPU-engaged. The three virtualized resources may be associated with distinct users (e.g., three distinct user accounts), and may be remotely accessed by three distinct user devices. Generally, an arbitrary number of virtualized resources may be simultaneously QPU-engaged, and each engagement can be independent of the others. For example, each virtualized resource may QPU-engaged for a different amount of time or a different purpose. In some instances, each virtualized resource (810, 820, and 830) can be stored on (and may operate on) a respective host server, or all three virtualized resources can be stored on (and may operate on) a single host server located close to the QPU 880. In some instances, the virtualized resources 810, 820, and 830 compile quantum programs on engines 840, 850, and 860, respectively. The compiled binary programs are then sent to three different instrument sets (872, 874, and 876) in rack 870, corresponding to the three engines 840, 850, and 860, respectively. The compiled programs are then run on three independent configurations of qubits and qubit-qubit links (882, 884, 886) on the QPU 880, which is effectuated by instrument sets 872, 874, and 876, respectively. The partition of the rack 870 may be determined by the number of independent configurations of qubit and qubit-qubit links available on the chip in the QPU 880. In some cases, a single quantum program initiated via a single virtualized resource can be run across multiple QPUs. The parallel implementation may be achieved using a scheduler (e.g., as described below or otherwise) that partitions a quantum program into parallelizable parts. The example multitenancy computing system 800 may include additional or different features, and the components of the system 800 may operate as described with respect to FIG. 8 or in another manner.

In some implementations, the physical connections between a server that operates the virtualized resources 810, 820, 830 and the engines 840, 850, 860, between the engines 840, 850, 860 and the rack 870, and between the rack 870 and the QPU 880 form a plurality of low-latency communication pathways between the virtualized resources 810, 820, 830 and the QPU 880. The physical connections may be provided, for example, by the types of hardware described with respect to FIG. 2. Such equipment may operate in the system 800 as a communication channel that provides low-latency communication pathways from virtualized resources in a classical computing system to respective QPU instances in a quantum computing system.

Figure 9:
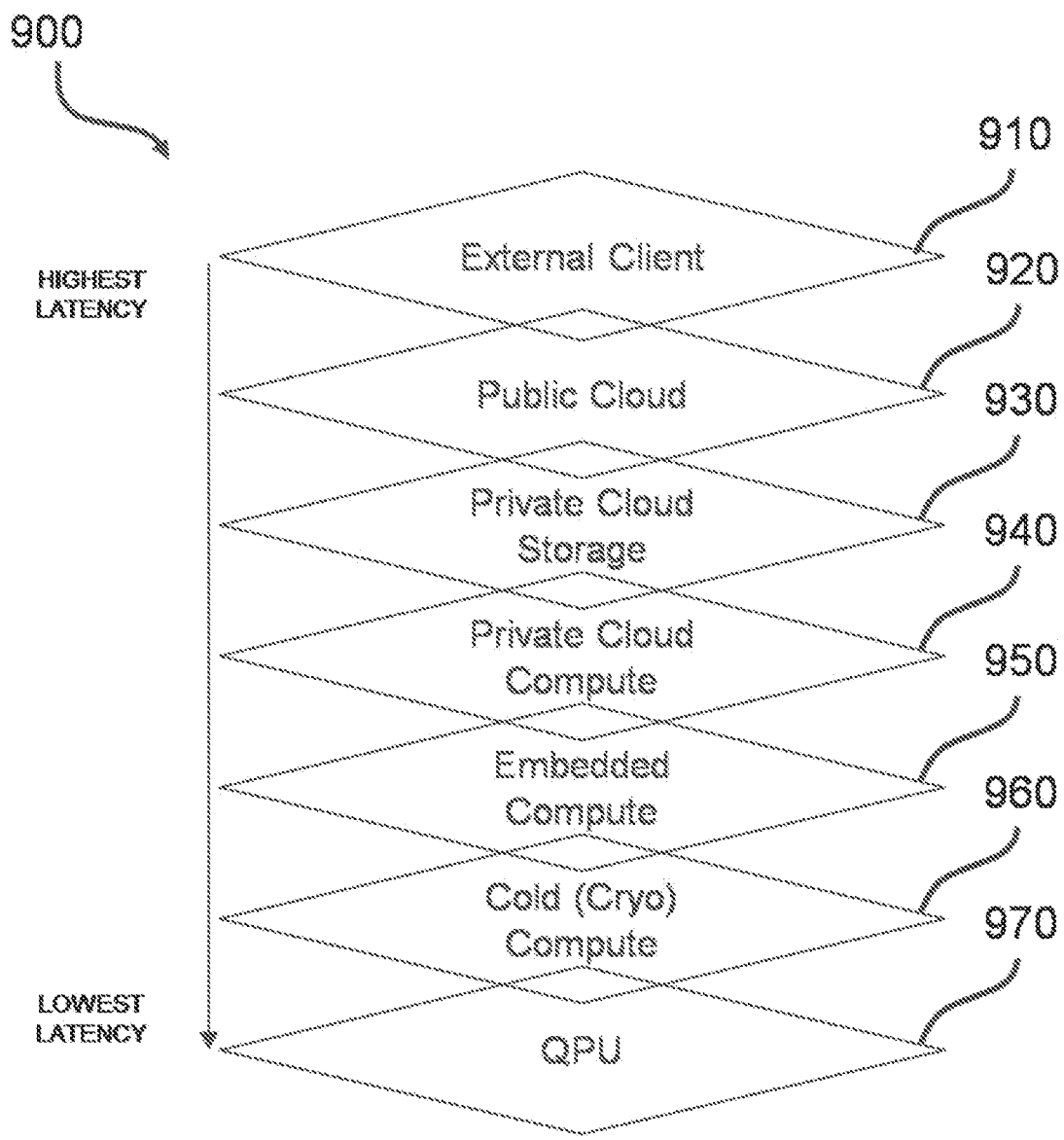
FIG. 9 is a representation of differing levels of latency in some example computing systems.

FIG. 9 is a representation 900 of differing levels of latency in some example computing systems. For example, one or more of the latency levels shown in FIG. 9 may be provided in a computing environment that includes a high-performance computing system. In some contexts, the levels of latency may be defined with reference to the time required to run an iterative hybrid classical/quantum program on a QPU, where updates to the program are performed between iterations. In these and other contexts, the latency may be primarily determined by the time for data to be transmitted between the QPU and a classical computer system where the updates are determined.

For purposes of illustration, the levels of latency may be described with reference to the example computing environment 100 shown in FIG. 1. In the example shown in FIG. 9, the highest latency level shown is for an external client 910 such as the user's environment on their own computer (e.g., the remote user devices 110B, 110C in FIG. 1); next is a third-party resource such as a public cloud 920 (e.g., the type provided by Amazon Web Services or Microsoft Azure Cloud Services, which may be accessible to the computing system 101 via the wide area network 115 in FIG. 1); next is private cloud storage 930, which is an on-premises classical resource that may be optimized for storage (e.g., a storage device included in the other resources 107 in FIG. 1); next is private cloud compute 940, which is an on-premises classical resource optimized for low-latency hybrid classical/quantum computing, having a direct low-latency connection to the instruments and/or embedded computing resources that control the QPU (e.g., an example configuration of the servers 108 in FIG. 1); next is embedded compute 950, which are classical computing resources on the instrument rack that controls the QPU (e.g., an example configuration of the controllers 106A, 106B in FIG. 1); next is cold compute 960, where the classical computing resources are in the cryostat which contains the quantum processor chip (applicable for superconducting circuit QPUs) (e.g., an example environment that may be provided by the control systems 105A, 105B in FIG. 1); last is the QPU 970 itself, where there are classical computing resources at the QPU chip level (e.g., an example configuration of the QPUs 102A, 102B in FIG. 1). Other levels of latency may be provided in a computer environment in some cases.

Figure 10:
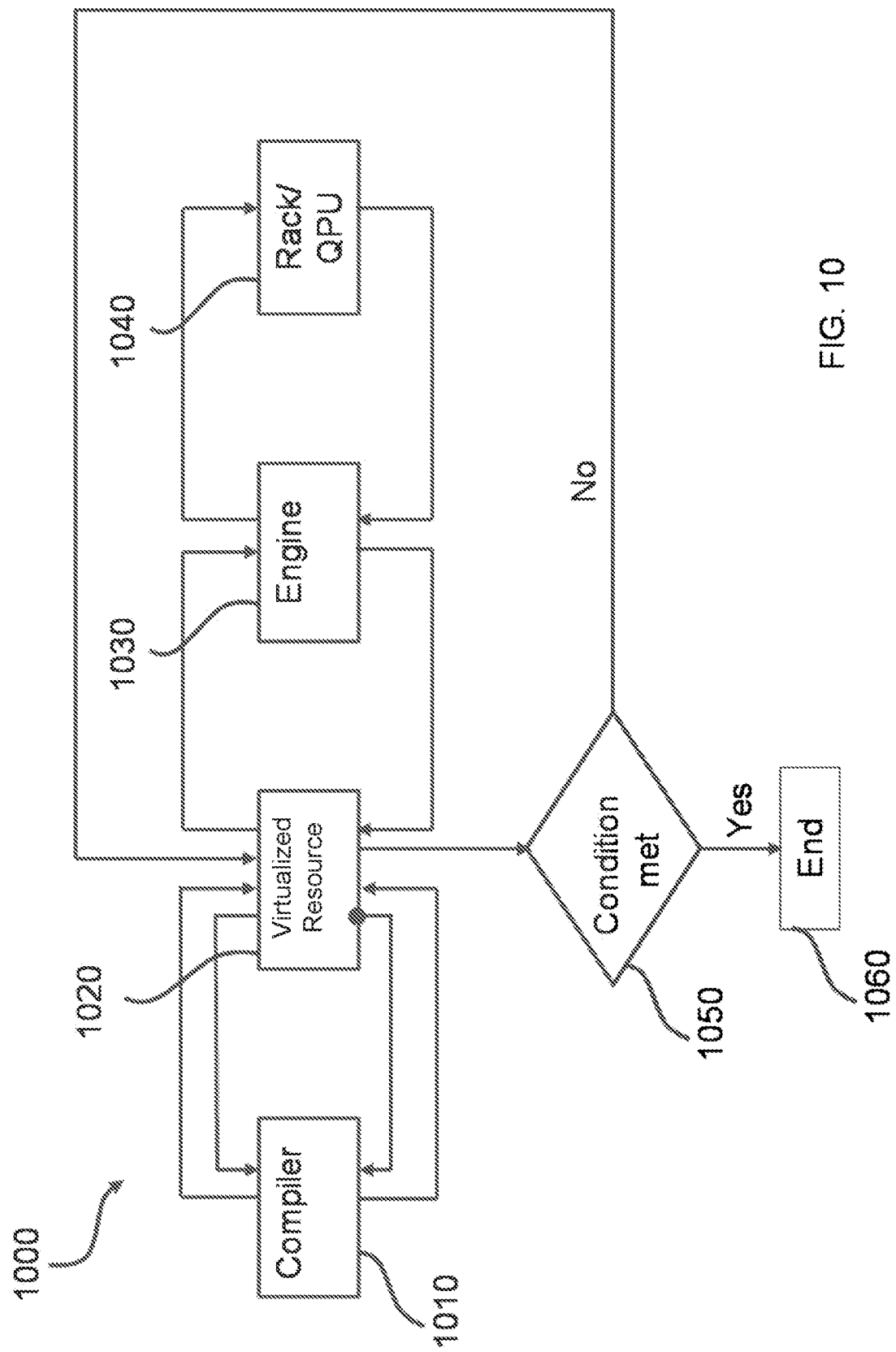
FIG. 10 is a diagram of an example hybrid fast quantum program execution process.

FIG. 10 is a diagram of an example hybrid classical/quantum program execution process 1000. In some cases, the example process 1000 shown in FIG. 10 may be executed according to, in connection with, or further to the example process 500 shown in FIG. 5. In some implementations, the example process 1000 may be implemented in the example computing environment 100 of FIG. 1, the example computing system 200 of FIG. 2 or in another type of computing system.

FIG. 10 shows example operations performed by a compiler 1010, a virtualized resource 1020, an engine 1030 and a rack/QPU 1040. The compiler 1010 and the virtualized resource 1020 may be implemented in a classical computer system for instance, as the compiler 221 and the virtualized resource 222 shown in FIG. 2. In some cases, the virtualized resource 1020 and the compiler 1010 operate on the same server (e.g., a host server), or they may operate on separate servers. The engine 1030 and the rack/QPU 1040 may be implemented in a quantum computer system, for instance, as the engine 240, the rack 250 and the QPU 260 in FIG. 2.

In the example process 1000 shown in FIG. 10, the virtualized resource 1020 accesses a source code quantum program, e.g., in the form of arbitrary Quil program. The source code quantum program is then sent to the compiler 1010 to be compiled to a native Quil program, which may be sent to the virtualized resource 1020. The compiler 1010 may further compile the native Quil program to an updatable (partial) binary program, which may be sent to the virtualized resource 1020. For example, after the native Quil program has been generated, the second part of the parametric compilation process can be performed. For every native Quil instruction, the compiler 1010 knows the corresponding calibration information to fetch and instrument instructions to specify. Therefore, native Quil can be compiled into a collection of parametric binaries, which may have the values for their parameters set at runtime. The updatable binary programs (and in some cases, parameter values) are then sent to the engine 1030, which produces updated (executable) binary programs (e.g., patched binaries) and sends the results to the rack/QPU 1040 for execution. In some implementations, the virtualized resource 1020 has a low-latency communication link to the rack/QPU 1040. The rack/QPU 1040 returns the measurement data (e.g., raw signal data or otherwise) to the engine 1030, which classifies the measurement data into binary measurement results. The output of the engine 1030 is fed back to a classical optimizer at the virtualized resource 1020. A decision engine 1050 (e.g., in a classical computer system) determines whether the condition for optimization of the objective function for the computation is met; if so, the output of the computation is generated and the process 1000 terminates at 1060. If the optimization condition is not met, then the process 1000 goes back to the virtualized resource 1020 and a new set of parameters is chosen and the process 1000 is repeated.

In some implementations of a computing system, a scheduler coordinates utilization of quantum resources (e.g., lattices, etc.), for example, in accord with a system use schedule. This coordination can include acting on a hybrid classical/quantum computer system according to the schedule, managing the schedule, managing quantum resources, enforcing users' compliance with the schedule, sending notifications to user devices, data collection (e.g., tracking use of services by a user, for billing purposes or otherwise), or a combination of these and other types of tasks. The scheduler can provide access control information (ACI) to the system, for instance, to enable engagement of virtualized resources and to permit utilization of quantum resources for a specific calendared time (e.g., a reservation). The access control information may include for example, an instruction set architecture (ISA), an end time of reservation, identification of quantum resource to be accessed, or a combination of these and other types of information.

In some example schedulers, a calendar may be implemented as a database representation of events ("reservations"), where a reservation is a block of time in the calendar, between a start time and an end time. In some implementations, a reservation may have additional information assigned to it, such as a user identification, a virtualized resource identification, a classical resource claiming the reservation, the device, lattice or other quantum resource (e.g., a QPU or quantum simulator) the reservation is claiming for its period of time (and implicitly any classical control resources required by that quantum resource), or a combination of these and others. In some cases, a scheduler may represent reservations in terms of epochs, which is a minimum indivisible unit of time in the calendar. In some implementations, the epoch duration divides one hour (e.g., one hour may be an integer multiple of the epoch duration), and all calendar events have a duration of some integer multiple of the epoch duration. In some implementations, calendar event start times may be restricted to epoch intervals starting on the hour, quarter hour, etc., for example. A scheduler process may occur periodically at a scheduler process interval. In some implementations, the scheduler process interval divides the epoch (such that one epoch is an integer multiple of the scheduler process interval, for example).

Figure 11:
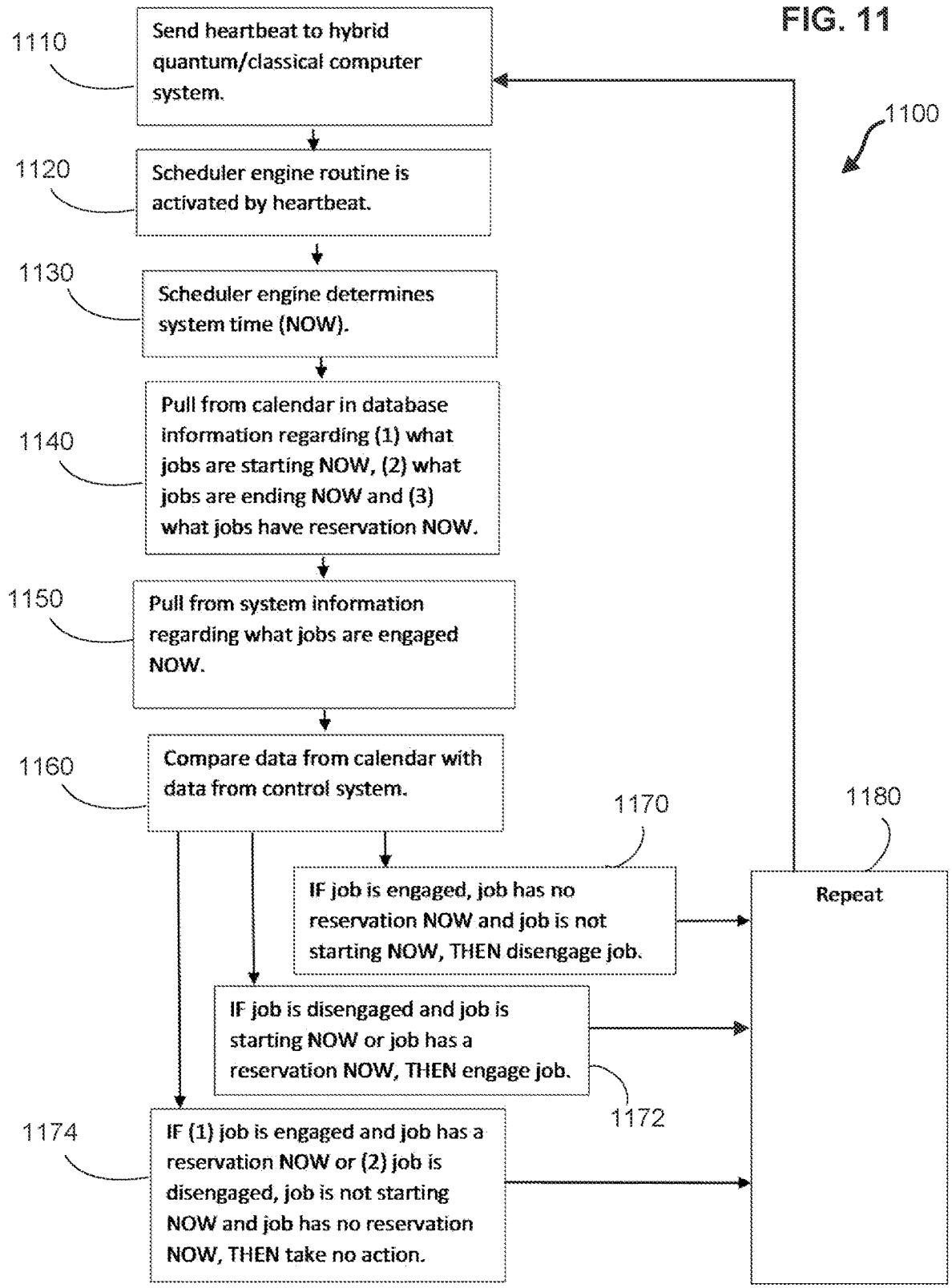
FIG. 11 is a flow chart showing an example process run by a scheduler.

FIG. 11 shows an example process 1100 that may be run by an example scheduler. For example, the process 1100 may be executed to change the state of, or act upon, a hybrid classical/quantum computer system (e.g., to ensure compliance with a calendar), according to a schedule. At 1110, a heartbeat is sent to the hybrid classical/quantum computer system; the heartbeat may be generated by a chronometer. At 1120, the scheduler engine routine is activated by the heartbeat; the scheduler engine and the chronometer can be situated on the same server or on distinct servers or can be components of one or more processor, for example. At 1130, the scheduler engine determines the system time (NOW) of the hybrid classical/quantum computer system. At 1140, the scheduler engine pulls calendar data from the calendar database. The calendar data includes information regarding (1) which jobs are starting NOW, (2) which jobs are ending now, and (3) which jobs have reservations NOW. Here, a job includes an execution of a quantum program on the QPU. The calendar database can be situated on a server, one or more processors, or a memory device, for example. At 1150, the scheduler engine pulls control system data from the control engine, control rack, virtualized resource and/or network switch. The control system data includes information regarding which jobs are engaged NOW. At 1160, the scheduler engine compares the data pulled from the calendar with the information pulled regarding which jobs are actually engaged and may perform an appropriate action based on the comparison. In the example shown in FIG. 11, the scheduler engine performs one or more of the operations represented at 1170, 1172 and 1174 in FIG. 11 based on the comparison at 1160. At 1170, if a job is engaged and the job has no reservation NOW, then disengage the job. At 1172, if a job is disengaged and the job has a reservation NOW, then engage the job. At 1174, (1) if a job is engaged and the job has a reservation NOW, then take no action, and (2) if a job is disengaged, the job is not starting NOW and the job has no reservation NOW, then take no action. At 1180, the process 1100 is repeated, starting at 1110 again. The process 1100 may be run at any time, although in some implementations heartbeats can have a frequency which is at minimum the inverse of the minimum booking time (epoch) on the system, or the scheduler process interval.

In some implementations, a scheduler may also handle booking of reservations by a user account. For example, a user device may submit a request with the desired number of epochs for a reservation (total time), a desired start time and a desired lattice. The scheduler may examine the calendar for gaps of a sufficient number of epochs on or after the requested start time, and may either make a reservation or provide options to the user, followed by making a reservation when the user makes a selection. A reservation in the calendar will typically include a start time, an end time, a lattice identification, and a user identification. In some implementations, the scheduler may send resource requests to a resource availability/allocation engine for identification of resource offerings and communication of the same to the scheduler. The resource availability/allocation engine may utilize an algorithm or application of select criteria in order to identify resource offerings for a particular user. A wide range of algorithms and criteria can be chosen for use by the resource availability/allocation engine including first come first served allocation of resources, allocation of resources optimized to make maximum use of a QPU, etc.

FIG. 12 is a quantum logic circuit diagram 1200 showing example qubit reset operations. The quantum logic circuit diagram 1200 shows a passive reset process applied to a first qubit 1202 and an active reset process applied to a second qubit 1204. In the example quantum logic circuit diagram 1200, both qubits 1202 and 1204 begin in the ground state, represented as the computational basis state $|0\rangle$ in FIG. 12.

The first qubit 1202 evolves under a unitary operation 1212, which manipulates the coherent state of the first qubit 1202, and the first qubit 1202 is then measured by a measurement operation 1216. The measurement operation 1216 collapses the first qubit 1202 to one of its computational basis states, either |0⟩ or |1⟩, and produces a corresponding binary measurement result. To reset the first qubit 1202 to the ground state |0⟩, an idle period 1220 is provided in the quantum logic circuit. The idle period 1220 represents a passive reset process, in which active control is not applied to the first qubit 1202. During the idle period 1220, the first qubit 1202 relaxes (e.g., under a T1 decoherence process) to its ground state |0⟩. As such, the idle period 1220 is long enough (e.g., equal to or longer than, or in some instances some integer multiple of, the characteristic T1 coherence time) to ensure the ground state |0⟩ is achieved.

The second qubit 1204 evolves under a unitary operation 1214, which manipulates the coherent state of the qubit 1204, and the second qubit 1204 is then measured by a measurement operation 1218. The measurement operation 1218 collapses the second qubit 1204 to one of its computational basis states, either |0⟩ or |1⟩, and produces a corresponding binary measurement result. To reset the second qubit 1204 to the ground state |0⟩, a conditional NOT gate 1222 is applied based on the measurement result obtained by the measurement operation 1218. In the example shown in FIG. 12, the conditional NOT gate 1222 either: does nothing if the qubit is already in the ground state |0⟩ according to the measurement operation 1218; or coherently rotates the qubit by 180 degrees (about the X axis of the Bloch sphere) if the qubit is in the excited state | 1 ⟩ according to the measurement operation 1218. The conditional NOT gate 1222 represents an active reset process, in which the second qubit 1204 is flipped (e.g., under a coherent rotation) to its ground state |0⟩ only if the measurement operation 1218 indicates the excited state |1⟩. As such, the active reset process may utilize coherent control of the second qubit 1204 to reset the state of the second qubit 1204 to the ground state |0⟩.

As shown in FIG. 12, the active reset process applied to the second qubit 1204 can be much faster than the passive reset process applied to the first qubit 1202. As such, active reset may be applied to all qubits in a QPU, for example, to reduce the amount of time between iterations of a program or to otherwise improve QPU utilization. In some implementations, the amount of time that is required to apply the active reset process to the second qubit 1204 is less than the coherence time of the second qubit 1204.

FIG. 13 is a block diagram of an example computing environment 1300 using containers as virtual resources. The example computing environment 1300 shown in FIG. 13 includes a developer 1302, data centers 1304, 1330, 1331, 1332 such as a server, a collection or a cluster of servers, server farm, container farm, etc. In embodiments, assets 1304, 1330, 1331 and 1332 may be in two or more data centers—for example, data center 1332 may be in a first data center and one or more of 1304, 1330 and 1331 may be in a second data center, furthermore, asset 1332 may be in a first data center and two or more of 1304, 1330 and 1331 may be in a second data center, furthermore, asset 1332 may be in a first data center and 1330 and 1331 may be in a second data center. A computing environment may include additional or different features, and the components of a computing environment may operate as described with respect to FIG. 13 or in another manner.

The developer 1302 shown in FIG. 13 may include one or more classical processors, memories, user interfaces, communication interfaces, and other components. For instance, the developer 1302 may be implemented as a user device 110 to access computing resources of the computing system 101, as shown in FIG. 1. In this case, the developer 1302 sends information (e.g., programs, instructions, commands, requests, input data, etc.) to the application programing interface (API) 1335; and in response, the developer 1302 receives information (e.g., application data, output data, prompts, alerts, notifications, results, etc.) from the API 1335. The developer 1302 may access services of the computing system 1308 in another manner, and the computing system 1308 may expose computing resources in another manner (e.g. through a web server designed to be accessed through a web browser running on developer 1302).

The example data center 1304 shown in FIG. 13 represents infrastructure associated with the user and accessible by the developer 1302. In some cases, the data center 1304 can be a private server, a private data center or another type of private resource owned or operated by the user. In some cases, the data center 1304 can be a cloud-based service operated by a third party, or another type of third-party resource provided to the user. For instance, the data center 1304 may provide data management and potentially other computing services to the developer 1302 and other clients (e.g., in a SaaS (software-as-a-service) format or otherwise). The example data center 1304 may include one or more non-quantum (i.e., "classical") application execution elements 1316 available to the developer 1302. In some implementations, the non-quantum application elements 1316 may include one or more of the following: computers, virtual machines (VMs), and containers, which need not be visible to the data center 1332—in some embodiments not visible to data center 1332 and in other embodiments accessible by computing system 1332. The non-quantum application execution elements 1316 may be used for services such as, for example data pre-processing and visualization. Furthermore, in some embodiments, the Non-Quantum Application Execution Elements 1316 may include a Container Management & Execution System such as the Container Management & Execution System 1312.

The example data storage 1318 of the data center 1304 shown in FIG. 13 is configured to store information or data for the user. In some implementations, the data storage 1318 is used to store information or data to be analyzed by the computing system 1308. The data storage 1318 of the data center 1304 may receive data from one or more of the non-quantum application elements 1316. Data stored in the data storage 1318 can be directly provided to the computing system 1308, which does not require the information or data to be migrated or replicated into the computing system 1308. In some cases, sensitive information such as, for example security information, personal identification information, etc. can be protected from being shared with the computing system 1308. In some implementations, the data storage 1318 may include a database or another type of resource. In some other cases, data may be provided to the computing system 1308 by requesting transfer between data center 1332 and data center 1304 through the API 1335.

The example API 1335 shown in FIG. 13 is configured to provide one or more administration functions such as, for example account management services, security credentials, billing reports, etc. The API 1335 may also provide a common entry point enabling user devices to access and interact with the computing system 1308; the API 1335 may be connected to Container Management & Execution System 1312 by communication channel 1341. In some implementations, the API 1335 may include an HTTP server, a Parallel Page engine (PPE), one or more portal repositories, a single sign-on server, or a combination of these and other resources. In some cases, the API 1335 may include one or more servers, virtual machines or containers configured as a single machine or distributed configurations depending on the number of user requests. Each of the one or more servers may include a CPU, memory and input/output (I/O) devices. In some implementations, the developer 1302 may access the computing system 1308 through the API 1335 via a virtual, private and secure channel.

The example computing system 1308 includes classical and quantum computing resources and exposes their functionality or services to the user. The computing system 1308 shown in FIG. 13 includes one or more quantum computing systems 1314. The computing system 1308 may also be coupled to the data center 1330. In some implementations the computing system 1308 will have access to a data storage 1324 in the (remote) data center 1330 for the purposes of storing and accessing periodic measurements made on the quantum computing system. Such measurements may be used to manage performance of the quantum processing unit (QPU) 1326, to provide necessary information for compiling of quantum applications and to provide general performance information useful for the maintenance and operation of the quantum computing system 1314. Some other implementations may locate the data storage 1324 in other data centers (e.g. in data center 1332). A computing system may include additional or different features, and the components of a computing system may operate as described with respect to FIG. 13 or in another manner.

In some implementations, the computing system 1308 may include a container management and execution system 1312. The container management and execution system 1312 may include multiple nodes 1320. The nodes 1320 may be configured to provide container management and execution services to users. In some implementations, each of the nodes may be implemented as the classical servers 108 of the computing system 101 as shown in FIG. 1. The nodes 1320 are configured to interact with the quantum computing system 1314 within the computing system 1308 by communication channel 1343 to provide low communication latency, for example, when frequent access to the quantum computing system 1314 by the user's classical application workload managed by the container management and execution system 1312 is utilized. In embodiments, communication channel 1343 may be a low latency local network as described above.

In some implementations, workloads provided by the user are managed as application containers 1322 deployed on the nodes 1320 of the computing system 1308. Container orchestration may be deployed as an automatic process of coordinating, scheduling, and managing containers. Each of the containers 1322 may include an application, an operating system (OS), dependencies, etc. In some cases, a container 1322 gets executed based on access policies, priorities and any other pre-defined criteria on one node 1320. In some cases, scheduling and allocation of a node 1320 can be static according to a time window of a client. For example, any queued jobs that are submitted can be executed when the time window of the quantum processing system (e.g., QPU 1326) becomes available. In some cases, scheduling or allocation of a node can be managed according to the priorities such as, for example, time during a day, cost, and capacity of the computing resources.

In some implementations, a container-based workload management framework allows flexible, automated mapping of workloads to classical computing resources. For example, using the container-based workloads management framework, a container can be executed on any available classical computing resource and the classical computing resources can be dynamically allocated as the workloads dynamically reshape. For another example, the container-based workload management framework may enable simple, automated recovery from hardware failures. In some implementations, the container-based workload management framework may include Singularity, Kubernetes, Mesos, Docker Swarm, Openshift or another type of framework.

In some implementations, container-based workloads provided by the user may make use of data storage 1323 during operation of the workload. In some implementations data storage 1323 may be durable across multiple user workloads allowing different workloads in different containers 1322 to access data at different times. For example, the results of a computation performed by one workload performed in one instance of a container 1322 may be used as input to another workload performed in a different instance of container 1322.

In some implementations, each of the nodes 1320 of the computing system 1308 may include multiple namespaces to support the services provided to the user. For example, a Jupyterlab namespace may be used as an interface for interactive development and back-testing of hybrid algorithms and models. As another example, a custom namespace developed specifically for the system of the present invention may be used for executing well-defined, optimized, tested production-ready applications or quantum programs in an automated, repeatable manner. As another example, a custom namespace may be created to segregate users onto separate underlying resources for security or capacity management reasons. In some implementations, the multiple namespaces share the computing resources within the computing system 1308. This sharing of compute resources is facilitated by the Container Management & Execution System 1312, or other workload orchestration system.

The example computing system 1308 can provide services to the user devices 110, for example, as a cloud-based or remote-accessed computer system, as a distributed computing resource, as a supercomputer or another type of high-performance computing resource, or in another manner. The computing system 1308 or the user devices 110 may also have access to one or more other quantum computing systems (e.g., quantum computing resources that are accessible through the wide area network 115, the local network 109 or otherwise).

The example quantum computing system 1314 shown in FIG. 13 may include one or more quantum processing units 1326. In some implementations, a certain number of the quantum processing units 1326 may be grouped to form a subnet of quantum processing units 1326 performing as a layer of temporally and/or spatially multiplexed units, for example, to improve or optimize utilization of quantum resources. A quantum computing system may include additional or different features, and the components of a quantum computing system may operate as described with respect to FIG. 1 or in another manner.

In some instances, all or part of the quantum processing unit 1326 functions as a quantum processor, a quantum memory, or another type of subsystem. For example, the quantum processing unit(s) 1326 may be implemented as the example quantum processing units 102A, 102B shown in FIG. 1 or in another manner. In some cases, the quantum computing system 1314 includes one or more control systems associated with the quantum processing unit(s) 1326. For instance, the quantum computing system 1314 may include control systems implemented as the example control systems 105A, 105B shown in FIG. 1 or in another manner.

The example data center 1330 shown in FIG. 13 includes a data storage 1324, which can store information provided by other applications. In some implementations, the information can be generated for calibrating or fine tuning a quantum program for one or more quantum processing units 1326 via a virtual, private and secure channel. In some cases, the data center 1330 includes resources that can monitor the operation condition of the quantum processing unit 1326 and retune the quantum processing unit 1326 periodically. In some implementations, the information stored on the data center 1330 includes calibration and measurement information of the one or more quantum processing units 1326, which may be stored, for example, in a measurement database of the data storage 1324. In some implementations, the information stored in the data storage 1324 of the data center 1330 is not visible or directly accessible to the user (through the developer 1302). In some implementations, the data center 1330 may be provided by a cloud platform provider such as, for example, Google Cloud Platform (GCP), Microsoft Azure, IBM Cloud, Amazon Web Service (AWS) and many others. In some implementations the Data Storage 1324 may be located in data center 1332 for increased performance.

In some aspects of operation, the example system architecture represented by FIG. 13 allows users to maintain their own classical computing platform (which may be any private or third-party platform and may be physically and logically separate from the computing system 1308) and to interface their classical computing platform (represented in FIG. 13 as the data center 1304) with cloud-based quantum computing resources provided by the computing system 1308. For example, the data center 1304 may directly access the API 1335 (e.g., via Internet or another wide area network), so that containers 1322 and other resources stored on the user's classical computing platform can be provided to the computing system 1308 as needed (e.g., without requiring long-term storage on the computing system 1308). The developer 1302 can also have access to the data center 1304 to store and access user data independent of the API 1335 and the computing system 1308. Further, each user can utilize their own classical computing platform, which can reduce or avoid a need for migration.

In some aspects of operation, the container management and execution system 1312 can use its collective hardware resources (represented as the nodes 1320) to operate containers 1322 from a number of different user devices (clients) or a number of different virtualized resources, or to operate multiple containers 1322 from the same client representing for example multiple instances of a container. For example, the same classical hardware can receive containers 1322 from different clients, receive multiple containers from one client, receive a container from one client for which multiple instances are to be run, etc., and operate two or more of the containers 1322 concurrently (e.g., in parallel). Accordingly, the quantum computing system 1314 may be accessed and utilized by multiple containers 1322 concurrently, which may entail secure, concurrent utilization of quantum resources by multiple different clients. (Further details of multitenancy are provided above with reference to FIG. 8.) Furthermore, the quantum computing system 1314 may be accessed and utilized by multiple containers 1322 concurrently, which may entail secure, serial utilization of quantum resources by multiple different clients, wherein the utilization is managed by a scheduler or orchestrator. This may improve utilization of quantum resources without compromising speed, security and other system attributes.

In embodiments, Data Centers 1304, 1330, 1331, 1332 may be physically separated and logically different data centers or may be combined wholly or severally into one or more data centers with no loss of generality. In some embodiments, Data Centers 1304, 1330 and 1331 may be combined into a single Data Center communicating with Data Center 1332. Furthermore, some embodiments may combine any or all of the functions of 1304, 1330, 1331 and 1332 into a single data center.

Figure 14:
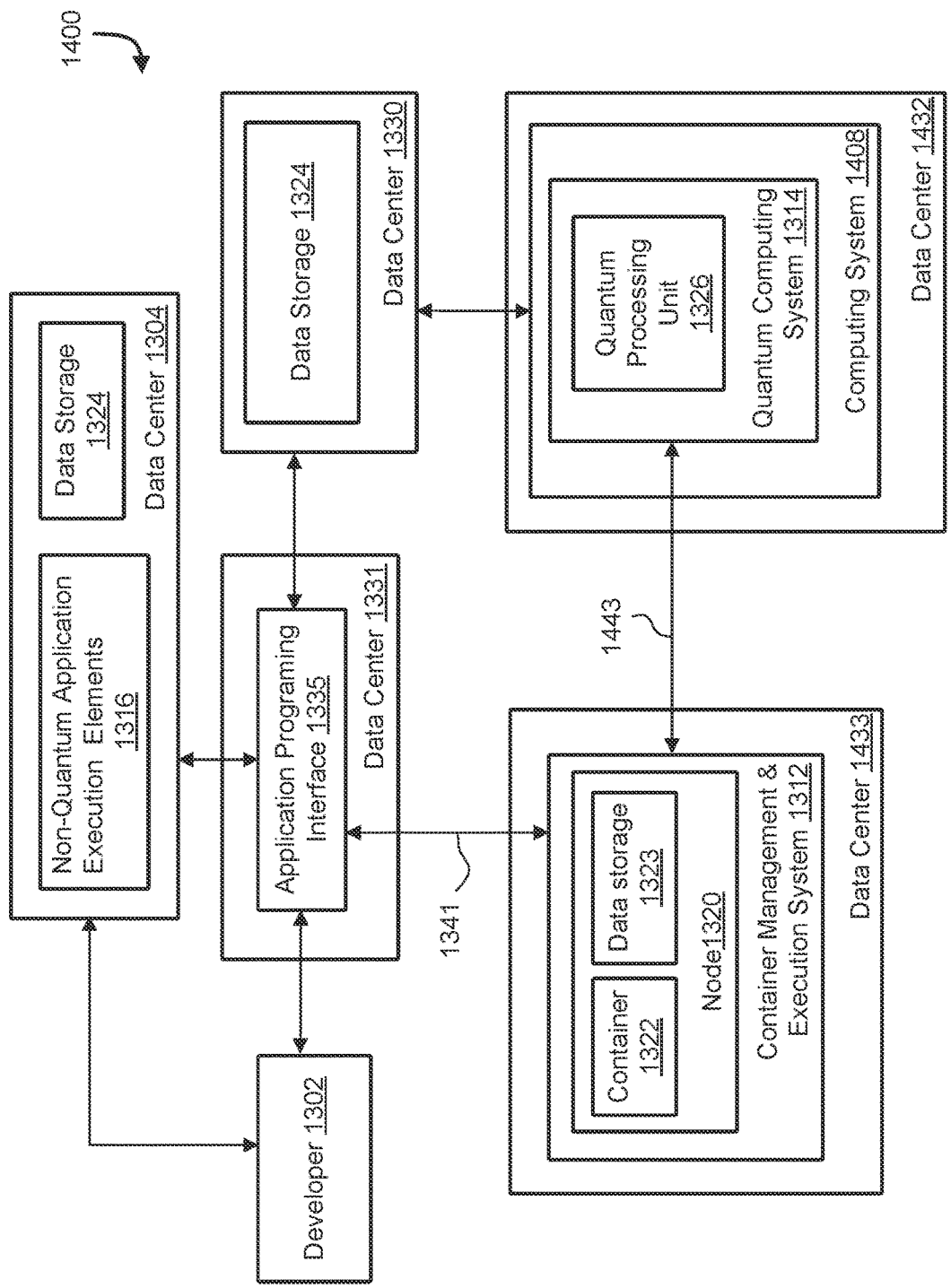
FIG. 14 is a block diagram of a second example of a hybrid quantum/classical computing environment using containers as virtual resources.

In some embodiments, the classical resources running in a container management system 1312 may be moved into a separate data center. An example of such an architecture is given in FIG. 14. In this example the system 1400 may operate with resources managed by Container Management & Execution System 1312 in Data Center 1433 and coupled to Quantum Computing System 1314 in Data Center 1432 over a communication channel 1443, such as a high-speed wide-area network. Communication channel 1443 may be less than 10 miles long, or in other embodiments may be less than 50 miles long. This utilization of separate data centers may have benefits in security, and cost management. In some implementations the developer may own and manage the resources in Data Center 1433, and the quantum computing system owner may manage the resources in data center 1432. In other implementations both of Data Centers 1433 and 1432 may contain resources managed by the owner of the quantum computing system. This is generalizable to multiple Data Centers like 1433 owned by multiple developers all being serviced by a quantum computing system located in its' separate Data Center 1432, as shown in FIG. 15.

Figure 15:
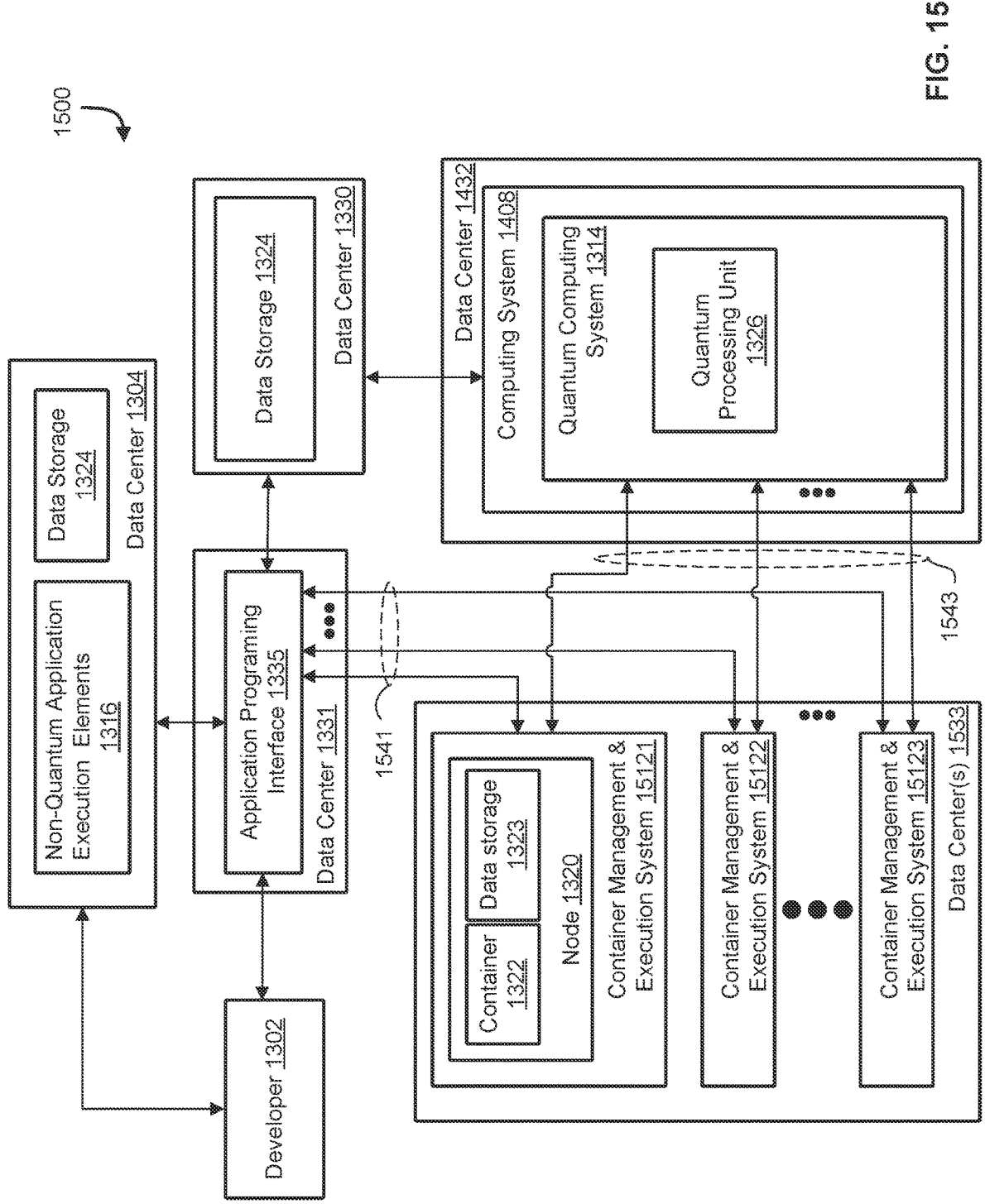
FIG. 15 is a block diagram of a third example of a hybrid quantum/classical computing environment using containers as virtual resources.

FIG. 15 shows a system 1500 with a multiplicity of Container Management & Execution Systems 15121, 15122, 15123 (there may be two or more of these container management systems) in Data Center(s) 1533. Data Center(s) 1533 can be one or more data centers; for example, there may be a multiplicity of container management systems and data centers such that there is one container management system per data center, there may be a multiplicity of separate container management systems in a single data center, or the multiplicity of separate container management systems may be distributed in more than one data center. A multiplicity of communication channels 1541 are shown between API 1335 and the container management systems—one communication channel per container management system. A multiplicity of communication channels 1543 are shown between the container management systems 15121, 15122, 15123 and the Quantum Computing System 1314—one connection per container management system.

Figure 16:
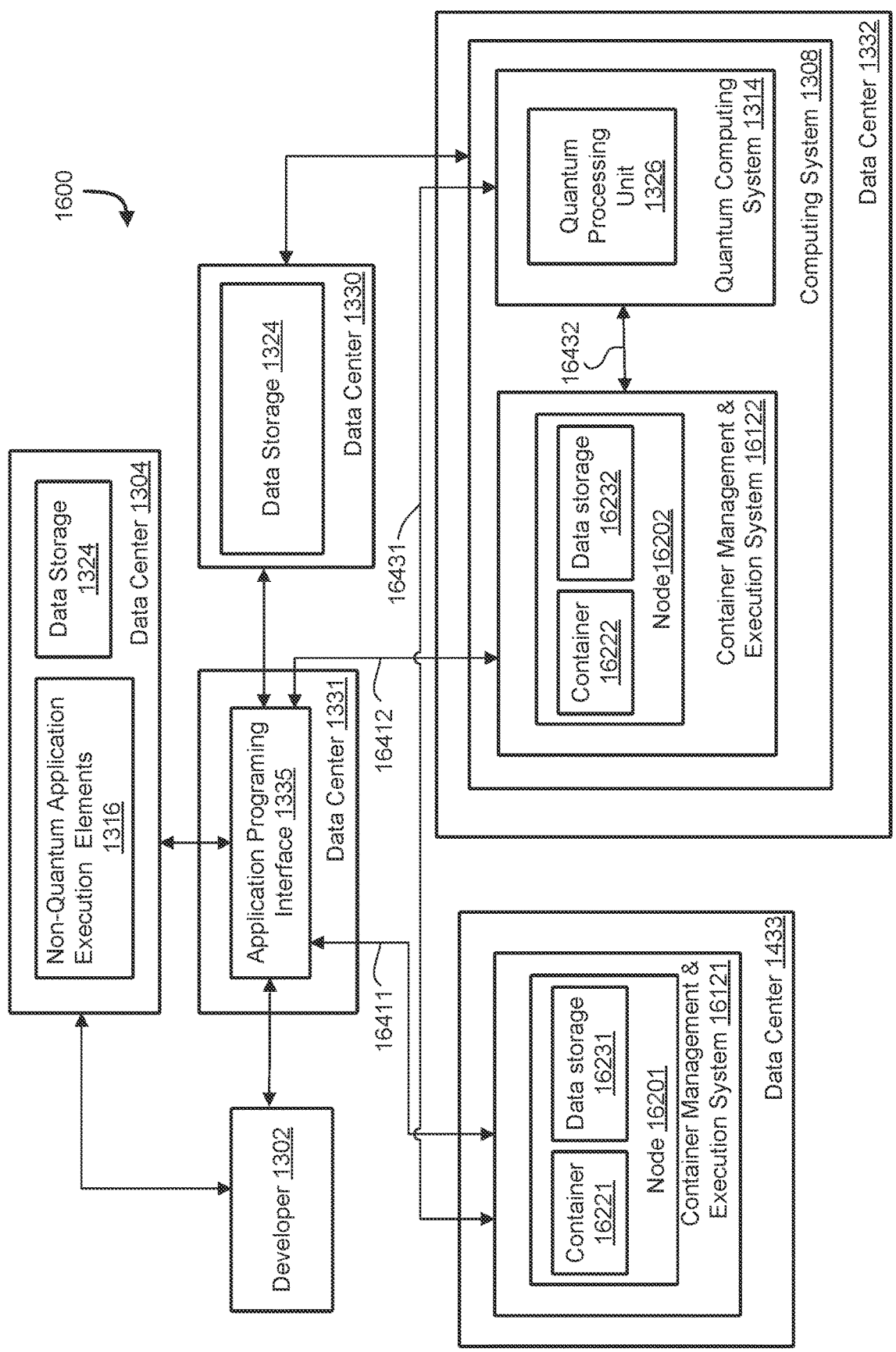
FIG. 16 is a block diagram of a fourth example of a hybrid quantum/classical computing environment using containers as virtual resources.

FIG. 16 shows a further example of an architecture according to some embodiments. System 1600 comprises container management systems 16121 and 16122 which may be strategically utilized during running a quantum computing job where a very low latency communication channel 16432 is desired for part of the job, and a higher latency communication channel 16431 can be tolerated for other parts of the job. The API 1335 may be used to manage the use of the different container management systems. Container management systems 16121 and 16122 may be sent different containers or identical copies of the same container for running such a job.

In some embodiments, communication channels, such as 1343, 1443, 1543, 16431 and 16432, may comprise multiple communication channels with different latencies, for example by providing different networks/communication channels in parallel, wherein each one of the parallel communication channels is individually selectable, for communications between the first container management and execution system and the quantum computing system. The type of communication channel used may be chosen to reduce the cost of running a particular computer program while maintaining a specified level of computational performance; the choice of communication channel can be automated at the application programming interface or the container management and execution system, for example, to achieve a particular performance requested by the user, although in some instances the user may choose to specify the particular communication channels to use.

In some embodiments, the virtual resource used for providing a hybrid quantum/classical program to the hybrid computing system 1308 may be implemented as functions as a service, serverless computing, event-driven function, etc. delivered, for example, by an API call or equivalent or by some other means. An example implementation would provide that classical instructions be used to implement the classical part of a hybrid computation and the execution request for the quantum portion as a single function submitted to the execution system for processing and scheduling. This may improve the utilization of classical and quantum resources, while simplifying the construction and deployment of the hybrid program.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:
1. A cloud-based computer system comprising:
   a communication channel that provides communication between a container management and execution system and a quantum computing system;
   the container management and execution system configured to:
      receive a container comprising a hybrid classical/quantum program, the hybrid classical/quantum program comprising a first instruction portion to be executed by the quantum computing system and a second instruction portion to be executed by classical computing resources,
      compile the first instruction portion of the hybrid classical/quantum program to generate a patchable binary program, wherein the patchable binary program comprises parameter values;
provide the patchable binary program to the quantum computing system via the communication channel;
map the second instruction portion to one or more classical computing resources comprising at least one dynamically allocated resource, and
execute the second instruction portion of the hybrid classical/quantum program within the container using the one or more classical computing resources; and
the quantum computing system comprising:
a quantum processing unit configured to execute the patchable binary program, and
a control system configured to:
update the parameter values in the patchable binary program at runtime without further compilation of the first instruction portion, wherein updating the parameter values includes updating a data memory section of the patchable binary program that is referenced by an instruction memory section of the patchable binary program; and
provide the patchable binary program comprising the updated parameter values to the quantum processing unit for execution.

2. The computer system of claim 1, wherein the container management and execution system and the quantum computing system are co-located in a data center.

3. The computer system of claim 2, wherein the communication channel is a low latency communication channel.

4. The computer system of claim 2, wherein the communication channel is a local network with a network latency of less than 10 nanoseconds.

5. The computer system of claim 1, wherein the container management and execution system and the quantum computing system are located in different data centers.

6. The computer system of claim 5, wherein the communication channel is a high-speed wide-area network.

7. The computer system of claim 5, wherein the container management and execution system is a first container management and execution system, the communication channel is a first communication channel, the container is a first container, the hybrid classical/quantum program is a first hybrid classical/quantum program, and the computer system further comprises:
a second container management and execution system configured to receive a second container and execute a second hybrid classical/quantum program within the second container; and
a second communication channel between the second container management and execution system and the quantum computing system configured to provide additional program instructions to the quantum computing system.

8. The computer system of claim 7, wherein the first container management and execution system and the second container management and execution system are located in the same data center and are securely isolated from each other.

9. The computer system of claim 7, wherein the first container management and execution system and the second container management and execution system are located in different data centers.

10. The computer system of claim 9, wherein the second container management and execution system and the quantum computing system are located in different data centers.

11. The computer system of claim 9, wherein the second container management and execution system is located in a first data center, co-located with the quantum computing system.

12. The computer system of claim 11, wherein the first container and the second container are coordinated to run a single integrated quantum computer program.

13. The computer system of claim 12, wherein the first communication channel and the second communication channel have different latencies.

14. The computer system of claim 9, wherein the first communication channel and the second communication channel have different latencies.

15. The computer system of claim 7, comprising an application programming interface configured to manage the first container management and execution system and the second container management and execution system.

16. The computer system of claim 1, wherein the quantum processing unit is a first quantum processing unit, and the quantum computing system further comprises a second quantum processing unit.

17. The computer system of claim 1, wherein the communication channel comprises a plurality of parallel communication channels with different latencies, and wherein one of the plurality of parallel communication channels is individually selectable and configured to provide communications between the container management and execution system and the quantum computing system.

18. The computer system of claim 1, wherein the container management and execution system is configured to compile the first instruction portion of the hybrid classical/quantum program to generate the patchable binary program by:
compiling the first instruction portion of the hybrid classical/quantum program to generate a native program; and
compiling the native program to the patchable binary program with the parameter values.

19. The computer system of claim 1, wherein the parameter values of the patchable binary program comprise parameters of single-qubit rotation gates in the first instruction portion to be executed by quantum computing system.

20. The computer system of claim 19, wherein updating the parameter values in the patchable binary program comprises updating the parameters of the single-qubit rotation gates with new values determined at runtime.

21. The computer system of claim 1, wherein the hybrid classical/quantum program is configured to be executed iteratively, and the control system of the quantum computing system is configured to, on each iteration:
update the parameter values for the iteration at runtime without further compilation of the first instruction portion; and
provide, to the quantum processing unit, the patchable binary program comprising the updated parameter values for the iteration.

* * * * *